(12) United States Patent
Baron et al.

(10) Patent No.: US 10,807,702 B2
(45) Date of Patent: Oct. 20, 2020

(54) CENTER FUEL TANK ASSEMBLY WITH PARTITIONED CENTER FUEL TANK FOR AN AIRCRAFT AND METHODS OF SEQUENCING FUEL FOR THE SAME

(71) Applicant: The Boeing Company, Chicago, IL (US)

(72) Inventors: Lennard T. Baron, Lake Stevens, WA (US); Todd W. Schulze, Everett, WA (US); Theodore N. Rydell, Bothell, WA (US); Timothy W. Purcell, Edmonds, WA (US); Patrick J. Mulvaney, Everett, WA (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 15/961,838

(22) Filed: Apr. 24, 2018

(65) Prior Publication Data
US 2019/0322357 A1 Oct. 24, 2019

(51) Int. Cl.
| | | |
|---|---|---|
| B64C 17/10 | (2006.01) | |
| F02M 37/00 | (2006.01) | |
| B64D 37/04 | (2006.01) | |
| B64C 3/34 | (2006.01) | |
| B65D 90/44 | (2006.01) | |
| B60K 15/077 | (2006.01) | |

(52) U.S. Cl.
CPC ............ *B64C 17/10* (2013.01); *B64C 3/34* (2013.01); *B64D 37/04* (2013.01); *F02M 37/0094* (2013.01); *B60K 15/077* (2013.01); *B65D 90/44* (2013.01)

(58) Field of Classification Search
CPC ........... B64C 3/34; B64C 17/10; B34D 37/02; B34D 37/04; B34D 37/06; B34D 37/08; B34D 37/14
See application file for complete search history.

(56) References Cited

U.S. PATENT DOCUMENTS

| | | | |
|---|---|---|---|
| 9,873,519 B2 * | 1/2018 | Perry | B64D 37/04 |
| 2005/0178880 A1 * | 8/2005 | Howe | B64D 37/04 244/10 |
| 2009/0212162 A1 * | 8/2009 | Ward | B64C 3/34 244/135 R |

* cited by examiner

*Primary Examiner* — Richard G Davis

(57) ABSTRACT

There is provided a center fuel tank assembly for an aircraft. The assembly includes a center fuel tank disposed in a central part of the aircraft. The assembly further includes one or more fuel barrier members partitioning the center fuel tank into two or more separate volume sections comprising two or more separate sub-tanks arranged in a fore-to-aft alignment to form a partitioned center fuel tank. The assembly further includes a fuel flow control assembly coupled to each of the two or more separate sub-tanks, each fuel flow control assembly operating independently. A sequential fuel burn of fuel in the two or more separate sub-tanks is made in a fore-to-aft sequence while the aircraft is in flight, to assist in shifting aftward a center of gravity (CG) of the aircraft, to reduce aircraft drag.

20 Claims, 9 Drawing Sheets

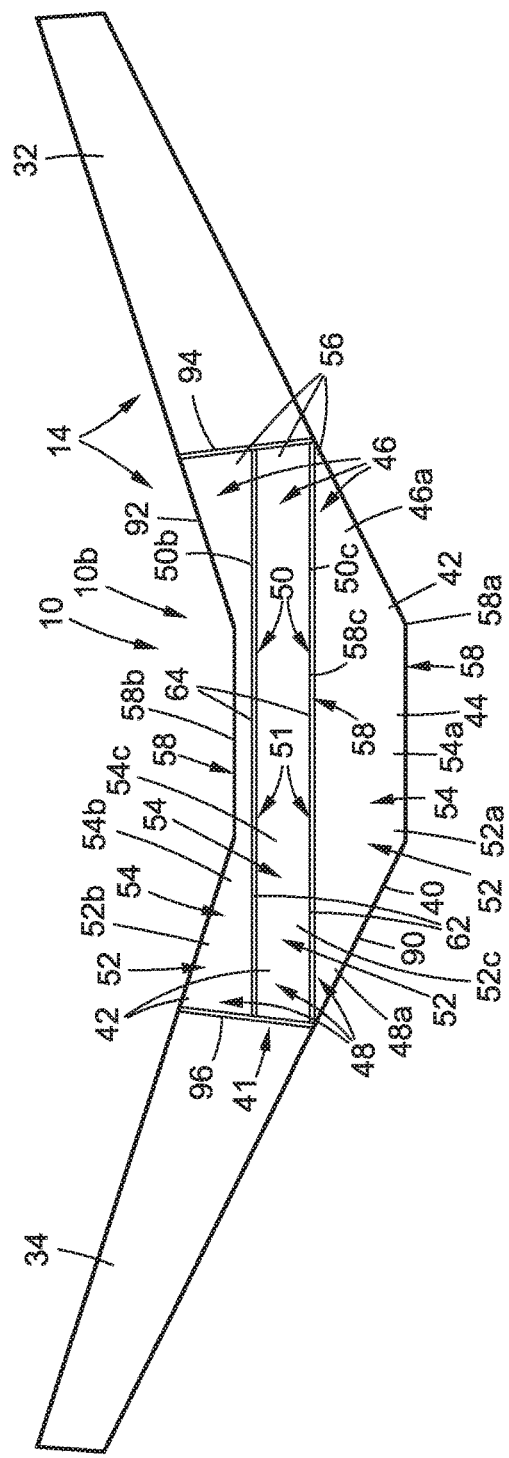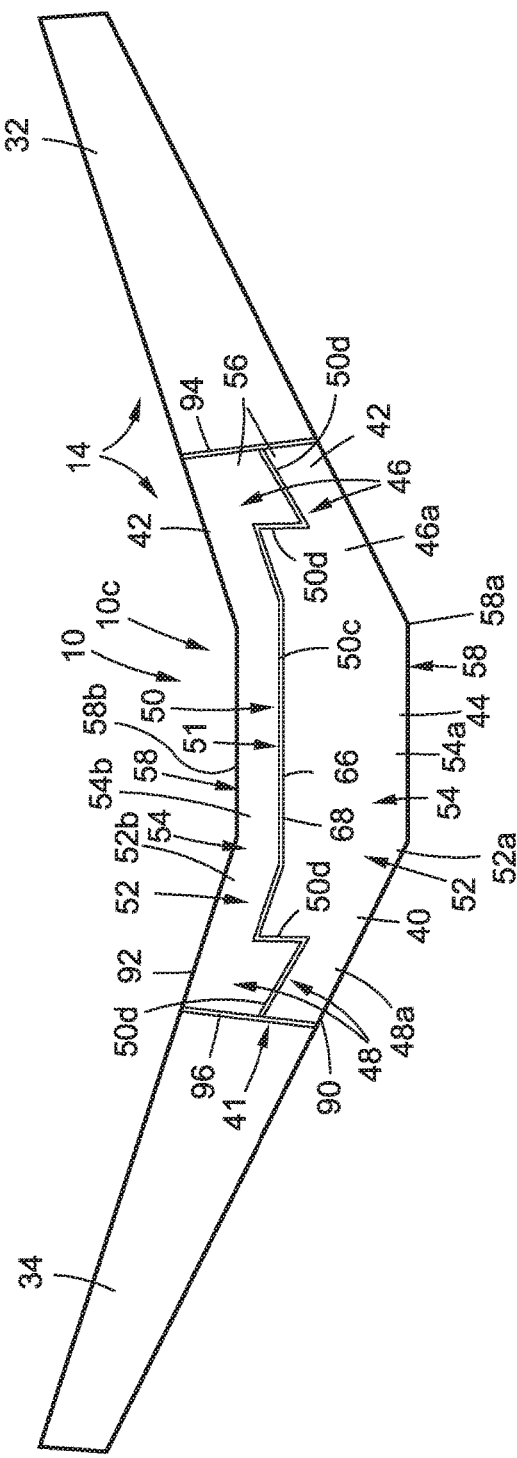

FIG. 6

VEHICLE 12 | AIRCRAFT 12a

FUEL TANK ARRANGEMENT 14 | FUSELAGE 16 | WINGS 18

FIRST MAIN FUEL TANK 32 | SECOND MAIN FUEL TANK 34 | SURGE TANKS 36

CENTER FUEL TANK ASSEMBLY 10

CENTRAL PART 38 | CENTRAL FUSELAGE AREA 38a | WING BOX 38b

CENTER FUEL TANK 40 | CENTER WING TANK 40a | PARTITIONED CENTER FUEL TANK 41

SEPARATE VOLUME SECTIONS 52 | SEPARATE SUB-TANKS 54 | FORE-TO-AFT ALIGNMT. 56

FORWARD SUB-TANK 54a | AFT SUB-TANK 54b | INTERMED. SUB-TANK(S) 54c

AFT-MOST UNLOADED SUB-TANK 54d | UNLOADED SUB-TANK(S) 54e

FORWARD-MOST LOADED SUB-TANK 54f | LOADED SUB-TANK(S) 54g

FUEL BARRIER MEMBER 50 | SEALED FUEL BARRIER MEMBER 51

STRUCTURAL WALL PARTITION 50a | RIGID DIVIDER STRUCTURE 50b

SPAN WISE BEAM 50c | RIB 50d | SPAR 50e | STRINGER 50f | PANEL 50g

SUBSTANTIALLY LINEAR FUEL BARRIER 62 | SUBSTANTIALLY LINEAR CONFIG. 64

NONLINEAR FUEL BARRIER 66 | NONLINEAR CONFIGURATION 68

SEALING MATERIAL 70 | FUEL FLOW CONTROL ASSEMBLY 72 | PUMPS 73 | VALVES 74

FUEL PICKUP ELEMENT 134 | FUEL SCAVENGE SYSTEM 136 | ACCESS OPENING(S) 138

FUEL QTY. INDICATOR 140 | FQIS 142 | NGS DISTRIB. ELEMT(S). 158 | NEA 160 | NGS 162

---

FUEL 60 | NEEDED FUEL 60a | PORTION 60b | REMAINING NEEDED FUEL 60c

LOADED FUEL 60d | RESIDUAL FUEL 60e | RESERVE FUEL 60f | NEEDED RESERVE FUEL 60g

USABLE FUEL QUANTITY 144 | FUEL QUANTITY LOAD 146 | PLANNED FLIGHT 148

FUEL QUANTITY DETERMINATION FACTORS 150 | PREDETERMINED PERFORMANCE 152

PLANNED FLIGHT DISTANCE 154 | AMOUNT 156 (OF NEEDED RESERVE FUEL)

SEQUENTIAL FUEL BURN 75 | FORE-TO-AFT SEQ. 76 | CG 78 | LESS AFT CG 78a | CG SHIFT 79

AIRCRAFT DRAG 80 | LONGITUDINAL TRIM DRAG 80a | AERODYNAMIC TRIM DRAG 80b

SEQUENTIAL FUEL LOADING 82 | AFT-TO-FORE SEQUENCE 84 | AFT AREA 85

CENTER FUEL TANK ASSEMBLY WITH PARTITIONED CENTER FUEL TANK FOR AN AIRCRAFT AND METHODS OF SEQUENCING FUEL FOR THE SAME

BACKGROUND

1) Field of the Disclosure

The disclosure relates generally to fuel tank assemblies and methods for aircraft, and more particularly, to center wing fuel tank assemblies and methods for commercial and military jet aircraft.

2) Description of Related Art

The fuel tank assemblies of large commercial and military jet aircraft may include a main fuel tank located in each of the wings of the aircraft and a center fuel tank located between the main fuel tanks. Prior to a planned flight of such aircraft, a quantity of fuel needed for the planned flight is determined, and such fuel is typically first loaded evenly into the main fuel tanks, and after the main fuel tanks are fully loaded, if additional fuel is needed, such additional fuel is typically loaded into the center fuel tank. Large commercial and military jet aircraft may use the center fuel tank to store a significant volume of fuel which may weigh up to 30% of a maximum takeoff weight of the aircraft. During flight and operation of the aircraft, if there is fuel in the center fuel tank, such fuel is typically used first, and after all the fuel in the center fuel tank is used, the fuel is typically evenly used from the main fuel tanks.

Such sequencing of the use of fuel in the fuel tank assemblies of long-range commercial and military jet aircraft may be used to change the center of gravity (CG) of the aircraft. For example, shifting the center of gravity (CG) aftward in a fore-aft direction may result in less lift required from the wing and an overall reduction in aircraft drag. Reduced aircraft drag may result in less fuel burn required by the aircraft engines.

Known systems and methods exist for reducing aircraft drag using sequencing of fuel to change the center of gravity (CG) of the aircraft. For example, such known systems and methods may use trim tanks located in the aft body or horizontal tail to move fuel during flight, shift the center of gravity (CG), and improve the trim drag of the aircraft in flight. However, such known systems and methods may have increased structural weight due to added fuel tanks and fuel system components required for such aft body and horizontal tail systems and methods. Moreover, such known systems and methods may have increased complexity due to additional redundant design features required to safeguard against a possibility of fuel being left in an aft body tank or a horizontal tail tank.

Accordingly, there is a need in the art for an aircraft center fuel tank assembly and method that shift the center of gravity (CG) aftward to reduce aircraft drag, that minimize any added structural weight, that minimize any increased complexity, and that are efficient, lower cost, and provide advantages over known aircraft fuel tank assemblies and methods.

SUMMARY

Example implementations of this disclosure provide for such an aircraft center fuel tank assembly and method for shifting the center of gravity (CG) aftward to reduce aircraft drag, while also minimizing any added structural weight and minimizing any increased complexity. As discussed in the below detailed description, versions of the aircraft center fuel tank assembly and method may provide significant advantages over known aircraft fuel tank assemblies and methods.

In one version there is provided a center fuel tank assembly for an aircraft. The center fuel tank assembly comprises a center fuel tank disposed in a central part of the aircraft.

The center fuel tank assembly further comprises one or more fuel barrier members partitioning the center fuel tank into two or more separate volume sections comprising two or more separate sub-tanks arranged in a fore-to-aft alignment to form a partitioned center fuel tank. Each of the two or more separate sub-tanks defines a closed interior fuel containment region configured to contain fuel for use by the aircraft.

The center fuel tank assembly further comprises a fuel flow control assembly coupled to each of the two or more separate sub-tanks. Each fuel flow control assembly operates independently. A sequential fuel burn of the fuel in the two or more separate sub-tanks is made in a fore-to-aft sequence while the aircraft is in flight, to assist in shifting aftward a center of gravity (CG) of the aircraft, to reduce aircraft drag.

In another version there is provided an aircraft. The aircraft comprises a fuselage. The aircraft further comprises a first wing and a second wing, each attached to the fuselage. The aircraft further comprises a first main fuel tank disposed in the first wing and a second main fuel tank disposed in the second wing. The aircraft further comprises a center fuel tank assembly disposed in a central part of the aircraft and positioned between the first main fuel tank and the second main fuel tank.

The center fuel tank assembly comprises a center fuel tank comprising a body with a center section within a central fuselage area of the fuselage, a first portion extending laterally from the center section and positioned within a first wing portion of the first wing, and a second portion extending laterally from the center section opposite the first portion and positioned within a second wing portion of the second wing. The center fuel tank assembly further comprises one or more fuel barrier members partitioning the center fuel tank into two or more separate volume sections comprising two or more separate sub-tanks arranged in a fore-to-aft alignment to form a partitioned center fuel tank. Each of the two or more separate sub-tanks defines a closed interior fuel containment region configured to contain fuel for use by the aircraft.

The center fuel tank assembly further comprises a sealing material applied to each of the one or more fuel barrier members, to seal each of the one or more fuel barrier members, so as to prevent the fuel from passing between the two or more separate sub-tanks. The center fuel tank assembly further comprises a fuel flow control assembly coupled to each of the two or more separate sub-tanks. Each fuel flow control assembly operates independently. The center fuel tank assembly further comprises a fuel pickup element coupled to each of the two or more separate sub-tanks and further coupled to a fuel scavenge system for the aircraft.

The center fuel tank assembly further comprises one or more access openings formed through each of the two or more separate sub-tanks. The center fuel tank assembly further comprises a fuel quantity indicator coupled to each of the two or more separate sub-tanks and further coupled to a fuel quantity indication system (FQIS) for the aircraft (12a) that calculates a usable fuel quantity in each of the two or more separate sub-tanks. The center fuel tank assembly further comprises one or more nitrogen generation system (NGS) distribution elements coupled to each of the two or more separate sub-tanks and configured to distribute nitrogen-enriched air (NEA) for a nitrogen generation system (NGS) for the aircraft (12a). A sequential fuel burn of the fuel in the two or more separate sub-tanks is made in a fore-to-aft sequence while the aircraft is in flight. This assists in shifting aftward a center of gravity (CG) of the aircraft, to reduce aircraft drag.

In yet another version there is provided a method of sequencing loading of fuel in an aircraft. The method comprises the step of assembling a center fuel tank assembly in a central part of the aircraft between a first main fuel tank disposed in a first wing of the aircraft and a second main fuel tank disposed in a second wing of the aircraft. The center fuel tank assembly comprises a center fuel tank partitioned with one or more fuel barrier members into two or more separate sub-tanks arranged in a fore-to-aft alignment to form a partitioned center fuel tank. Each of the two or more separate sub-tanks defines a closed interior fuel containment region configured to contain fuel for use by the aircraft, and each of the one or more fuel barrier members is sealed with a sealing material. The center fuel tank assembly further comprises a fuel flow control assembly coupled to each of the two or more separate sub-tanks. Each fuel flow control assembly operates independently.

The method further comprises the step of determining a fuel quantity load of fuel needed for the aircraft prior to a planned flight of the aircraft. The method further comprises the step of loading a portion of the needed fuel evenly into the first main fuel tank and the second main fuel tank, until both the first main fuel tank and the second main fuel tank are fully loaded.

The method further comprises the step of loading any remaining needed fuel into each separate sub-tank of the two or more separate sub-tanks of the partitioned center fuel tank, starting with an aft-most unloaded sub-tank, and continuing in an aft-to-fore sequence until any remaining needed fuel is loaded, such that an unloaded sub-tank is loaded only when each separate sub-tank positioned aft of the unloaded sub-tank is fully loaded. The aft-to-fore sequence of sequencing loading of fuel, including any remaining needed fuel, in the partitioned center fuel tank results in a center of gravity (CG) that is positioned further aft, as compared to a less aft center of gravity (CG) that results from loading fuel into an unpartitioned center fuel tank.

In yet another version there is provided a method of sequencing use of fuel in an aircraft in flight, to reduce aircraft drag. The method comprises the step of assembling, prior to sequencing use of fuel in the aircraft in flight, a center fuel tank assembly in a central part of the aircraft between a first main fuel tank disposed in a first wing of the aircraft and a second main fuel tank disposed in a second wing of the aircraft. The center fuel tank assembly comprises a center fuel tank partitioned with one or more fuel barrier members into two or more separate sub-tanks arranged in a fore-to-aft alignment to form a partitioned center fuel tank. Each of the two or more separate sub-tanks defines a closed interior fuel containment region configured to contain fuel for use by the aircraft. Each of the one or more fuel barrier members is sealed with a sealing material. The center fuel tank assembly further comprises a fuel flow control assembly coupled to each of the two or more separate sub-tanks. Each fuel flow control assembly operates independently.

The method further comprises the step of sequencing use of fuel in the aircraft in flight, by first using any fuel loaded in the partitioned center fuel tank, starting with a forward-most loaded sub-tank, and continuing in a fore-to-aft sequence, such that any fuel in a loaded sub-tank is used only when any fuel in each separate sub-tank positioned forward of the loaded sub-tank is fully used.

The method further comprises the step of evenly using fuel loaded in the first main fuel tank and the second main fuel tank, after using any fuel loaded in the partitioned center fuel tank. The fore-to-aft sequence of sequencing use of fuel in the aircraft in flight assists in shifting aftward a center of gravity (CG) of the aircraft, to reduce aircraft drag.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 3B is an illustration of a top plan view of a fuel tank arrangement with another version of a center fuel tank assembly of the disclosure having a partitioned center fuel tank;

FIG. 3C is an illustration of a top plan view of a fuel tank arrangement with yet another version of a center fuel tank assembly of the disclosure having a partitioned center fuel tank;

FIG. 6 is an illustration of a functional block diagram showing a vehicle with a fuel tank arrangement having versions of a center fuel tank assembly of the disclosure;

Each figure shown in this disclosure shows a variation of an aspect of the versions or embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions or embodiments may be provided and should not be construed as limited to the versions or embodiments set forth herein. Rather, these versions or embodiments are provided so that this disclosure will be thorough and fully convey the scope of the disclosure to those skilled in the art.

Figure 1:
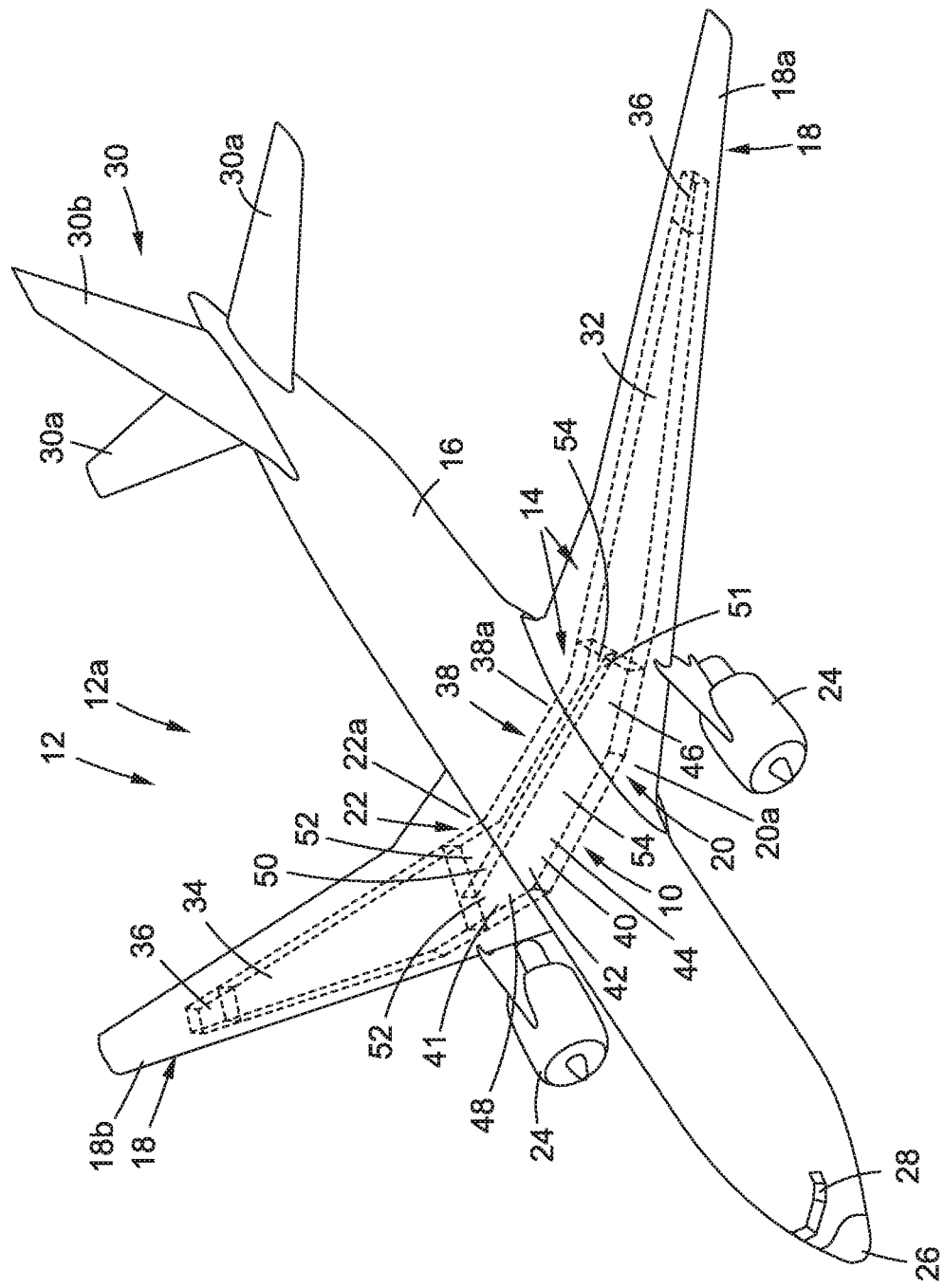
FIG. 1 is an illustration of a front perspective view of an aircraft having a fuel tank arrangement that incorporates a version of a center fuel tank assembly of the disclosure.

Now referring to the Figures, and in particular, with reference to FIG. 1, in one version of the disclosure there is provided a center fuel tank assembly 10 for a vehicle 12, such as in the form of an aircraft 12a. FIG. 1 is an illustration of a front perspective view of the vehicle 12, such as in the form of aircraft 12a, having a fuel tank arrangement 14 that incorporates a version of the center fuel tank assembly 10 of the disclosure. As shown in FIG. 1, the vehicle 12, such as in the form of aircraft 12a, comprises a fuselage 16, or body. As further shown in FIG. 1, the vehicle 12, such as in the form of aircraft 12a, comprises one or more wings 18, including a first wing 18a or left wing, extending from one side of the fuselage 16, and a second wing 18b or right wing, extending from the opposite side of the fuselage 16. As further shown in FIG. 1, the first wing 18a has a first wing portion 20, such as in the form of a first wing root portion 20a, located at the root of the first wing 18a, where the first wing 18a is attached to the fuselage 16. As further shown in FIG. 1, the second wing 18b has a second wing portion 22, such as in the form of a second wing root portion 22a, located at the root of the second wing 18b, where the second wing 18b is attached to the fuselage 16.

As further shown in FIG. 1, the vehicle 12, such as in the form of aircraft 12a, comprises an engine 24 attached to each wing 18, a nose section 26, a cockpit 28, and a tail section 30 with horizontal stabilizers 30a and a vertical stabilizer 30b. As further shown in FIG. 1, the fuel tank arrangement 14, in one version, comprises a first main fuel tank 32, or left wing main fuel tank, disposed in the first wing 18a or left wing, and comprises a second main fuel tank 34, or right wing main fuel tank, disposed in the second wing 18b or right wing. As further shown in FIG. 1, the fuel tank arrangement 14 may comprise a surge tank 36 coupled to each outboard end of the first main fuel tank 32 and the second main fuel tank 34, respectively. The surge tanks 36 (see FIG. 1) provide a collection area or storage area for smaller amounts of fuel 60 (see FIG. 6), such as overflow fuel, to go during thermal expansion of the fuel 60, or for example, if the fuel 60 becomes trapped during flight maneuvers or climb.

As further shown in FIG. 1, the fuel tank arrangement 14 comprises the center fuel tank assembly 10 disposed in a central part 38 of the aircraft 12a, for example, a central fuselage area 38a or a wing box 38b (see FIG. 6). The center fuel tank assembly 10 (see FIG. 1) is preferably positioned between the first main fuel tank 32 (see FIG. 1) and the second main fuel tank (see FIG. 1). The fuel tank arrangement 14 (see FIG. 1) may comprise an integral fuel tank arrangement within the structure or airframe of the aircraft 12a (see FIG. 1) or may comprise another suitable form or configuration.

The center fuel tank assembly 10 (see FIG. 1) comprises a center fuel tank 40 (see FIG. 1) disposed in the central part 38 (see FIG. 1) of the aircraft 12a (see FIG. 1), for example, such as disposed within the central fuselage area 38a (see FIG. 1) of the fuselage 16 (see FIG. 1) of the aircraft 12a and within portions of the wings 18 (see FIG. 1) of the aircraft 12a. The center fuel tank 40 (see FIG. 1) may also be referred to as a center wing tank 40a (see FIG. 6). The center fuel tank 40 (see FIG. 1), the first main fuel tank 32 (see FIG. 1), the second main fuel tank 34 (see FIG. 1), and the surge tanks 36 (see FIG. 1) may be in the form of integral fuel tanks formed as a fuel tank arrangement 14 (see FIG. 1) within the structure or airframe of the aircraft 12a (see FIG. 1). Each of the center fuel tank 40 (see FIG. 1), the first main fuel tank 32 (see FIG. 1), the second main fuel tank 34 (see FIG. 1), and the surge tanks 36 (see FIG. 1) in the fuel tank arrangement 14 (see FIG. 1) are configured to be loaded with fuel 60 (see FIG. 1), contain or hold fuel 60, and deliver or transfer fuel 60, such as jet fuel or another suitable type of fuel.

The center fuel tank 40 (see FIG. 1), or center wing tank 40a (see FIG. 6), may be located within the contour of the fuselage 16, such as the central fuselage area 38a (see FIG. 1) or such as the wing box 38b (see FIG. 6), and may extend outside the contour of the fuselage 16 into portions of the wings 18 (see FIG. 1). As shown in FIG. 1, the center fuel tank 40 comprises a body 42 with a center section 44 positioned within the central fuselage area 38a of the fuselage 16 of the aircraft 12a. The body 42 (see FIG. 1) of the center fuel tank 40 (see FIG. 1) further comprises a first portion 46 (see FIGS. 1, 3A), such as a first cheek portion 46a (see FIG. 3A), or left cheek portion, extending laterally from one side of the center section 44 (see FIG. 1). As shown in FIG. 1, the first portion 46, such as the first cheek portion 46a (see FIG. 3A), or left cheek portion, is preferably positioned, or substantially positioned, within the first wing portion 20, such as the first wing root portion 20a, of the first wing 18a, or left wing, extending from the fuselage 16 of the aircraft 12a.

The body 42 (see FIG. 1) of the center fuel tank 40 (see FIG. 1) further comprises a second portion 48 (see FIGS. 1, 3A), such as a second cheek portion 48a (see FIG. 3A), or right cheek portion, extending laterally from the other side of the center section 44. As shown in FIG. 1, the second portion 48 extends from the center section 44 opposite the first portion 46. As further shown in FIG. 1, the second portion 48, such as the second cheek portion 48a (see FIG. 3A), or right cheek portion, is preferably positioned, or substantially positioned, within the second wing portion 22, such as the second wing root portion 22a, of the second wing 18b, or right wing, extending from the fuselage 16 of the aircraft 12a. The center section 44 (see FIG. 1) is preferably integral with the first portion 46 (see FIG. 1) and the second portion 48 (see FIG. 1).

Figure 3A:
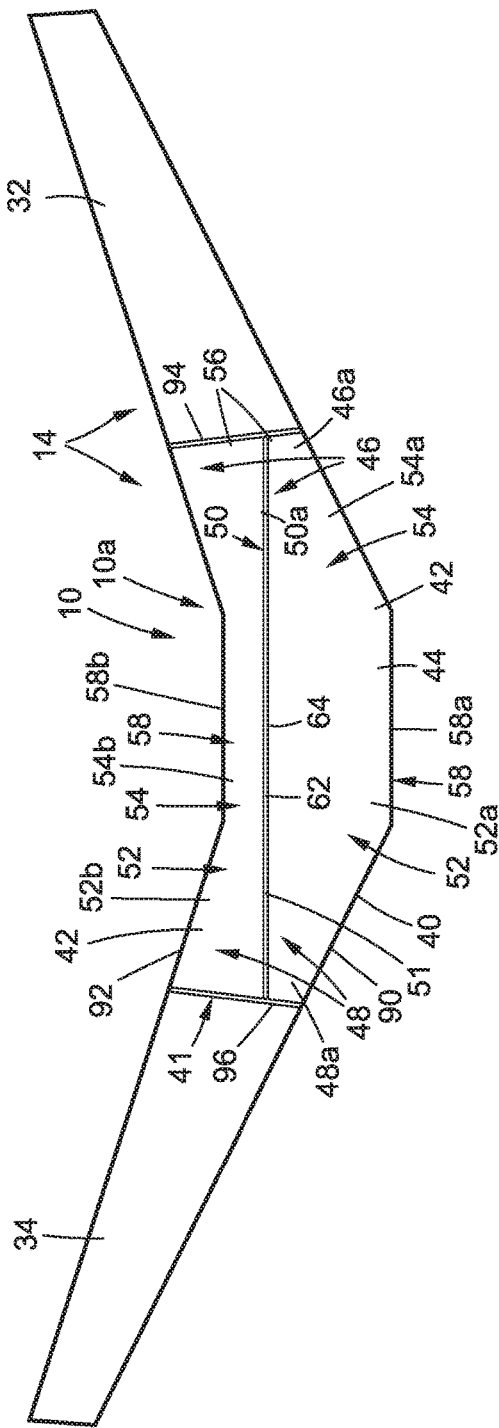
FIG. 3A is an illustration of a top plan view of a fuel tank arrangement with a version of a center fuel tank assembly of the disclosure having a partitioned center fuel tank.

As shown in FIG. 1, the center fuel tank assembly 10 further comprises one or more fuel barrier members 50 partitioning the center fuel tank 40 into two or more separate volume sections 52. In one version, as shown in FIG. 3A, discussed in detail below, the separate volume sections 52 may comprise a forward volume section 52a and an aft volume section 52b, arranged in a fore-to-aft alignment 56. As shown in FIG. 1, the two or more separate volume sections 52 preferably comprise two or more separate sub-tanks 54. In one version, as shown in FIG. 3A, the separate sub-tanks 54 may comprise a forward sub-tank 54a and an aft sub-tank 54b, arranged in the fore-to-aft alignment 56. The two or more separate volume sections 52 (see FIGS. 1, 3A) comprising the two or more separate sub-tanks 54 (see FIGS. 1, 3A) are arranged in the fore-to-aft alignment (see FIG. 3A) and form a partitioned center fuel tank 41 (see FIGS. 1, 3A).

At least the forward sub-tank 54a (see FIG. 3A) is formed in the forward volume section 52a (see FIG. 3A), and at least the aft sub-tank 54b (see FIG. 3A) is formed in the aft volume section 52b (see FIG. 3A). However, additional separate sub-tanks 54 (see FIGS. 1, 3A) may be formed in each of the separate volume sections 52 (see FIGS. 1, 3A).

As shown in FIG. 1, the center fuel tank 40 is partitioned with one fuel barrier member 50 into two separate sub-tanks 54 arranged in the fore-to-aft alignment 56 (see FIG. 3A), to form the partitioned center fuel tank 41. Each of the two or more separate volume sections 52 (see FIGS. 1, 3A) comprising the two or more separate sub-tanks 54 (see FIGS. 1, 3A) defines a closed interior fuel containment region 58 (see FIG. 3A) configured to contain fuel 60 (see FIG. 6) for use by the vehicle 12 (see FIG. 1), such as the aircraft 12a (see FIG. 1).

The one or more fuel barrier members 50 (see FIGS. 1, 6) may comprise one or more of, a structural wall partition 50a (see FIGS. 3A, 6) such as an aircraft structural wall partition, an aircraft wing structural wall partition, or an aircraft fuselage structural wall partition; a rigid divider structure 50b (see FIGS. 3B, 6) such as an aircraft rigid divider structure, an aircraft wing rigid divider structure, or an aircraft fuselage rigid divider structure; a span wise beam 50c (see FIGS. 3B, 3C, 6) such as an aircraft span wise beam, an aircraft wing span wise beam, or an aircraft fuselage span wise beam; a rib 50d (see FIGS. 3C, 6) such as an aircraft rib or an aircraft wing rib; a spar 50e (see FIG. 6) such as an aircraft spar or an aircraft wing spar; a stringer 50f (see FIG. 6) such as an aircraft stringer or an aircraft wing stringer; a panel 50g (see FIG. 6) such as an aircraft panel, an aircraft wing panel, or an aircraft fuselage panel; or another suitable fuel barrier member 50. The one or more fuel barrier members 50 (see FIGS. 1, 6) may be formed from existing structures used in the center fuel tank 40, for example, span wise beams 50c (see FIG. 6), and/or ribs 50d (see FIG. 6), and/or other structures. Using such structures in the center fuel tank 40 to form the one or more fuel barrier members 50 minimizes added structural weight, as compared to known fuel tank assemblies that have increased structural weight from added fuel tanks, added fuel system components, and other added structures. The one or more fuel barrier members 50 (see FIGS. 1, 6) may each be made of a metal material, such as aluminum, stainless steel, steel, titanium, or other metal materials; a composite material; or a combination of a metal material and a composite material.

In one version, the one or more fuel barrier members 50 (see FIGS. 1, 3A) may form one or more substantially linear fuel barriers 62 (see FIGS. 3A, 3B) having a substantially linear configuration 64 (see FIGS. 3A, 3B) between the two or more separate volume sections 52 (see FIGS. 1, 3A, 3B) comprising the two or more separate sub-tanks 54 (see FIGS. 1, 3A, 3B). In another version, the one or more fuel barrier members 50 (see FIGS. 1, 3C) form one or more nonlinear fuel barriers 66 (see FIG. 3C) having a nonlinear configuration 68 (see FIG. 3C) between the two or more separate volume sections 52 (see FIGS. 1, 3C) comprising the two or more separate sub-tanks 54 (see FIGS. 1, 3C).

The center fuel tank assembly 10 (see FIGS. 1, 6) may further comprise a sealing material 70 (see FIG. 6) applied to each of the one or more fuel barrier members 50 (see FIGS. 1, 6), to seal each of the one or more fuel barrier members 50, and to form one or more sealed fuel barrier members 51 (see FIGS. 1, 3A-3C, 6). The one or more sealed fuel barrier members 51 (see FIG. 1) sealed with the sealing material 70 (see FIG. 6) prevent fuel 60 (see FIG. 6) and other liquids and gases from passing between the two or more separate volume sections 52 (see FIGS. 1, 6) comprising the two or more separate sub-tanks 54 (see FIGS. 1, 6).

The sealing material 70 (see FIG. 6) preferably comprises fuel proof sealing compounds that maintain their sealing properties, including bond strength and flexibility, and resist deterioration, after prolonged exposure to fuel, such as jet aircraft fuel, and aviation gas, and that do not chemically react with any jet aircraft fuel or aviation gas. The sealing material 70 may comprise an aircraft fuel tank sealant, for example, a polymer sealant, or another suitable sealing material 70. Preferably, the sealing material 70 chosen has excellent adhesion to and is compatible with the material or materials of which the center fuel tank 40 (see FIG. 1) comprising the separate sub-tanks 54 (see FIG. 1) is/are made, for example, metal materials, such as aluminum, stainless steel, steel, titanium, and other metal materials, and composite materials.

The sealing material 70 (see FIG. 6) may be applied to surfaces of the one or more fuel barrier members 50 (see FIGS. 1, 3A), as well as other surfaces in the separate sub-tanks 54 (see FIG. 1), by injection gun, extrusion, applicators, or other suitable application devices or means. The sealing material 70 (see FIG. 6) may be applied to joints, such as faying surfaces of joints, fasteners, fittings, or other surfaces of the one or more fuel barrier members 50 (see FIGS. 1, 3A), as well as other surfaces in the separate sub-tanks 54 (see FIG. 1), to completely seal the one or more fuel barrier members 50 and any other surfaces in the separate sub-tanks 54, so as to prevent any fuel leakage or other leakage of liquids and gases between the separate sub-tanks 54.

As discussed below, the center fuel tank assembly 10 (see FIG. 1) further comprises a fuel flow control assembly 72 (see FIGS. 4, 6) coupled to each of the two or more separate volume sections 52 (see FIGS. 1, 6) comprising the two or more separate sub-tanks 54 (see FIGS. 1, 6). Each fuel flow control assembly 72 (see FIG. 6) operates independently. As further discussed below, the center fuel tank assembly 10 (see FIG. 1) comprises various other components.

With sequencing the use of fuel 60 (see FIG. 5) by the aircraft 12a (see FIG. 1), such as fuel burning by the engines 24 (see FIG. 1) using the center fuel tank assembly 10 (see FIG. 1), a sequential fuel burn 75 (see FIG. 6) of the fuel 60 (see FIG. 6) in the two or more separate volume sections 52 (see FIGS. 1, 6) comprising the two or more separate sub-tanks 54 (see FIGS. 1, 6) is made in a fore-to-aft sequence 76 (see FIG. 6), while the aircraft 12a (see FIG. 1) is in flight. This assists in shifting aftward a center of gravity (CG) 78 (see FIG. 6) of the aircraft 12a (see FIG. 1), to reduce aircraft drag 80 (see FIG. 6).

As used herein, "center of gravity (CG)" means the fore-aft location along a longitudinal axis of an aircraft, for example, aircraft 12a (see FIG. 1), where the longitudinal axis runs from the nose section 26 (see FIG. 1) to the tail section 30 (see FIG. 1), and the CG represents the balance point of the weight of the entire aircraft, including its fuel. Moving the CG 78 (see FIG. 6) aft results in less lift required from the wings 18 (see FIG. 1) and an overall reduction in aircraft drag 80 (see FIG. 6).

As used herein, "drag" means the aerodynamic force or resistance force that opposes an aircraft's motion or flight direction through the air. As used herein, "aerodynamic trim drag" means that component of the aircraft's overall drag which is attributable to the need to keep the aircraft in a stable (trim) position during a flight.

With sequencing the loading of fuel 60 (see FIG. 6) in the aircraft 12a (see FIG. 1) using the center fuel tank assembly 10 (see FIG. 1), a sequential fuel loading 82 (see FIG. 6) of the fuel 60 (see FIG. 6), in the two or more separate volume sections 52 (see FIGS. 1, 6) comprising the two or more separate sub-tanks 54 (see FIGS. 1, 6) is made in an aft-to-fore sequence 84 (see FIG. 6), while the aircraft 12*a* is being loaded with fuel 60, such as refueling the aircraft 12*a*.

Although FIG. 1 shows the center fuel tank assembly 10 used in a vehicle 12, such as an aircraft 12*a*, the center fuel tank assembly 10 may also be used in other vehicles, such as rotorcraft or another suitable vehicle 12 having a center fuel tank assembly 10 with a partitioned center fuel tank 41 (see FIG. 1) having multiple separate sub-tanks 54 that are designed for sequential fuel burn 75 (see FIG. 6) and/or sequential fuel loading 82 (see FIG. 6).

Figure 2:
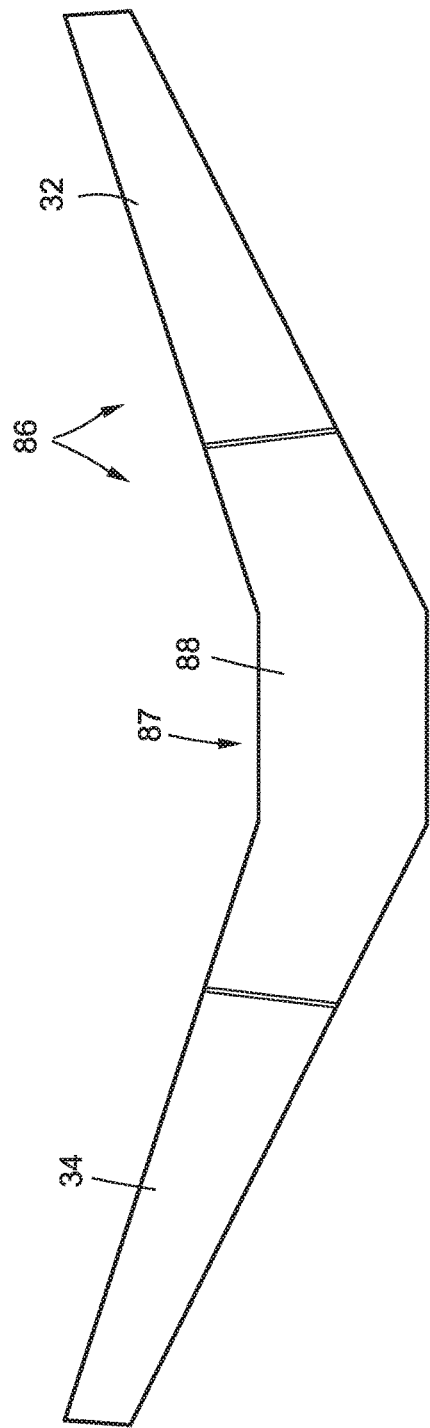
FIG. 2 is an illustration of a top plan view of a known fuel tank arrangement having a known center fuel tank that is unpartitioned.

Now referring to FIG. 2, FIG. 2 is an illustration of a top plan view of a known fuel tank arrangement 86 having a known center fuel tank 87 that is unpartitioned. FIG. 2 shows the known center fuel tank 87 comprising an unpartitioned center fuel tank 88 positioned between the first main fuel tank 32, or left wing main fuel tank, and the second main fuel tank 34, or right wing main fuel tank.

Now referring to FIG. 3A, FIG. 3A is an illustration of a top plan view of the fuel tank arrangement 14 with a version of the center fuel tank assembly 10, such as in the form of center fuel tank assembly 10*a*, having a partitioned center fuel tank 41 that is partitioned into two separate sub-tanks 54 with a substantially linear fuel barrier 62. As shown in FIG. 3A, the center fuel tank assembly 10, such as in the form of center fuel tank assembly 10*a*, is positioned between the first main fuel tank 32, or left wing main fuel tank, and the second main fuel tank 34, or right wing main fuel tank. As further shown in FIG. 3A, the center fuel tank assembly 10, such as in the form of center fuel tank assembly 10*a*, comprises the center fuel tank 40 partitioned with the fuel barrier member 50 into two separate volume sections 52 comprising two separate sub-tanks 54 arranged in the fore-to-aft alignment 56, to form the partitioned center fuel tank 41. As further shown in FIG. 3A, the two separate volume sections 52 comprise the forward volume section 52*a* and the aft volume section 52*b*, and the two separate sub-tanks 54 comprise the forward sub-tank 54*a* and the aft sub-tank 54*b*.

As further shown in FIG. 3A, in one version, the center fuel tank 40 is partitioned into the two separate volume sections 52 comprising the two separate sub-tanks 54 with the fuel barrier member 50 forming a substantially linear fuel barrier 62 having a substantially linear configuration 64. In this version, as shown in FIG. 3A, the center fuel tank assembly 10, such as in the form of center fuel tank assembly 10*a*, comprises the center fuel tank 40 having one fuel barrier member 50, and two separate sub-tanks 54 comprising the forward sub-tank 54*a* and the aft sub-tank 54*b*. The fuel barrier member 50 (see FIG. 3A) may be sealed with the sealing material 70 (see FIG. 6) to form the sealed fuel barrier member 51 (see FIG. 3A).

In one version, the fuel barrier member 50 (see FIG. 3A) may comprise a structural wall partition 50*a* (see FIG. 3A). Alternatively, the fuel barrier member 50 may comprise a rigid divider structure 50*b* (see FIGS. 3B, 6), a span wise beam 50*c* (see FIGS. 3B, 3C, 6), a rib 50*d* (see FIGS. 3C, 6), a spar 50*e* (see FIG. 6), a stringer 50*f* (see FIG. 6), a panel 50*g* (see FIG. 6), or another suitable fuel barrier member 50.

As further shown in FIG. 3A, each separate sub-tank 54 defines a closed interior fuel containment region 58 configured to contain fuel 60 (see FIG. 6) for the aircraft 12*a* (see FIG. 1). For example, the forward sub-tank 54*a* (see FIG. 3A) defines a forward closed interior fuel containment region 58*a* (see FIG. 3A) configured to contain fuel 60 (see FIG. 6), and the aft sub-tank 54*b* (see FIG. 3A) defines an aft closed interior fuel containment region 58*b* (see FIG. 3A) configured to contain fuel 60.

As further shown in FIG. 3A, the center fuel tank 40 comprises the body 42 with the center section 44, the first portion 46, such as the first cheek portion 46*a*, or left cheek portion, extending laterally from one side of the center section 44, and the second portion 48, such as the second cheek portion 48*a*, or right cheek portion, extending laterally from the other side of the center section 44. As further shown in FIG. 3A, the center fuel tank 40 partitioned with the fuel barrier member 50 comprises a forward-most end 90, an aft-most end 92, a first side end 94, and a second side end 96.

Now referring to FIG. 3B, FIG. 3B is an illustration of a top plan view of the fuel tank arrangement 14 with another version of the center fuel tank assembly 10, such as in the form of center fuel tank assembly 10*b*, having a partitioned center fuel tank 41 that is partitioned into three separate sub-tanks 54 with two substantially linear fuel barriers 62. As shown in FIG. 3B, the center fuel tank assembly 10, such as in the form of center fuel tank assembly 10*b*, is positioned between the first main fuel tank 32, or left wing main fuel tank, and the second main fuel tank 34, or right wing main fuel tank. As further shown in FIG. 3B, the center fuel tank assembly 10, such as in the form of center fuel tank assembly 10*b*, comprises the center fuel tank 40 partitioned with the fuel barrier member 50 into three separate volume sections 52 comprising three separate sub-tanks 54 arranged in the fore-to-aft alignment 56, to form the partitioned center fuel tank 41. As further shown in FIG. 3B, the three separate volume sections 52 comprise the forward volume section 52*a*, the aft volume section 52*b*, and the intermediate volume section 52*c*, and the three separate sub-tanks 54 comprise the forward sub-tank 54*a*, the aft sub-tank 54*b*, and the intermediate sub-tank 54*c*.

As further shown in FIG. 3B, in one version, the center fuel tank 40 is partitioned into the three separate volume sections 52 comprising the three separate sub-tanks 54 with two fuel barrier members 50 forming two substantially linear fuel barriers 62, each having a substantially linear configuration 64. In this version, as shown in FIG. 3B, the center fuel tank assembly 10, such as in the form of center fuel tank assembly 10*b*, comprises the center fuel tank 40 having two fuel barrier members 50, and three separate sub-tanks 54 comprising the forward sub-tank 54*a*, the aft sub-tank 54*b*, and the intermediate sub-tank 54*c*. The fuel barrier members 50 (see FIG. 3B) may each be sealed with the sealing material 70 (see FIG. 6) to form the sealed fuel barrier members 51 (see FIG. 3B).

In one version, the fuel barrier members 50 (see FIG. 3B) may comprise a rigid divider structure 50*b* (see FIG. 3B) and a span wise beam 50*c* (see FIG. 3B). Alternatively, the fuel barrier members 50 may comprise two rigid divider structures 50*b* (see FIG. 3B), two span wise beams 50*c* (see FIG. 3B), one or more structural wall partitions 50*a* (see FIGS. 3A, 6), one or more ribs 50*d* (see FIGS. 3C, 6), one or more spars 50*e* (see FIG. 6), one or more stringers 50*f* (see FIG. 6), one or more panels 50*g* (see FIG. 6), or other suitable fuel barrier members 50.

As further shown in FIG. 3B, each separate sub-tank 54 defines the closed interior fuel containment region 58 configured to contain fuel 60 (see FIG. 6) for the aircraft 12*a* (see FIG. 1). For example, the forward sub-tank 54*a* (see FIG. 3B) defines the forward closed interior fuel containment region 58*a* (see FIG. 3B) configured to contain fuel 60 (see FIG. 6), the aft sub-tank 54*b* (see FIG. 3B) defines the aft closed interior fuel containment region 58*b* (see FIG. 3B)

configured to contain fuel 60, and the intermediate sub-tank 54c (see FIG. 3B) defines an intermediate closed interior fuel containment region 58c (see FIG. 3B) configured to contain fuel 60.

As further shown in FIG. 3B, the center fuel tank 40 comprises the body 42 with the center section 44, the first portion 46, such as the first cheek portion 46a, or left cheek portion, extending laterally from one side of the center section 44, and the second portion 48, such as the second cheek portion 48a, or right cheek portion, extending laterally from the other side of the center section 44. As further shown in FIG. 3B, the center fuel tank 40 partitioned with the fuel barrier members 50 comprises the forward-most end 90, the aft-most end 92, the first side end 94, and the second side end 96.

Now referring to FIG. 3C, FIG. 3C is an illustration of a top plan view of the fuel tank arrangement 14 with yet another version of the center fuel tank assembly 10, such as in the form of center fuel tank assembly 10c, having a partitioned center fuel tank 41 that is partitioned into two separate sub-tanks 54 with a nonlinear fuel barrier 66 or staggered fuel barrier. As shown in FIG. 3C, the center fuel tank assembly 10, such as in the form of center fuel tank assembly 10c, is positioned between the first main fuel tank 32, or left wing main fuel tank, and the second main fuel tank 34, or right wing main fuel tank. As further shown in FIG. 3C, the center fuel tank assembly 10, such as in the form of center fuel tank assembly 10c, comprises the center fuel tank 40 partitioned with the fuel barrier member 50 into two separate volume sections 52 comprising two separate sub-tanks 54 arranged in the fore-to-aft alignment 56, to form the partitioned center fuel tank 41. As further shown in FIG. 3C, the two separate volume sections 52 comprise the forward volume section 52a and the aft volume section 52b, and the two separate sub-tanks 54 comprise the forward sub-tank 54a and the aft sub-tank 54b.

As further shown in FIG. 3C, in one version, the center fuel tank 40 is partitioned into the two separate volume sections 52 comprising the two separate sub-tanks 54 with one fuel barrier member 50 forming one nonlinear fuel barrier 66 having a nonlinear configuration 68, such as a staggered configuration. In this version, as shown in FIG. 3C, the center fuel tank assembly 10, such as in the form of center fuel tank assembly 10c, comprises the center fuel tank 40 having one fuel barrier member 50, and two separate sub-tanks 54 comprising the forward sub-tank 54a and the aft sub-tank 54b. The fuel barrier member 50 (see FIG. 3C) may be sealed with the sealing material 70 (see FIG. 6) to form the sealed fuel barrier member 51 (see FIG. 3C).

In one version, the fuel barrier members 50 (see FIG. 3C) may comprise a span wise beam 50c (see FIG. 3C) attached to a plurality of ribs 50d (see FIG. 3C) on each end of the span wise beam 50c. Alternatively, the fuel barrier members 50 may comprise one or more structural wall partitions 50a (see FIGS. 3A, 6), one or more rigid divider structures 50b (see FIG. 3B), one or more spars 50e (see FIG. 6), one or more stringers 50f (see FIG. 6), one or more panels 50g (see FIG. 6), or other suitable fuel barrier members 50.

As further shown in FIG. 3C, each separate sub-tank 54 defines the closed interior fuel containment region 58 configured to contain fuel 60 (see FIG. 6) for the aircraft 12a (see FIG. 1). For example, the forward sub-tank 54a (see FIG. 3C) defines the forward closed interior fuel containment region 58a (see FIG. 3C) configured to contain fuel 60 (see FIG. 6), and the aft sub-tank 54b (see FIG. 3C) defines the aft closed interior fuel containment region 58b (see FIG. 3C) configured to contain fuel 60.

As further shown in FIG. 3C, the center fuel tank 40 comprises the body 42 with the center section 44, the first portion 46, such as a first cheek portion 46a, or left cheek portion, extending laterally from one side of the center section 44, and the second portion 48, such as the second cheek portion 48a, or right cheek portion, extending laterally from the other side of the center section 44. As further shown in FIG. 3C, the center fuel tank 40 partitioned with the fuel barrier member 50 comprises the forward-most end 90, the aft-most end 92, the first side end 94, and the second side end 96.

Figure 4:
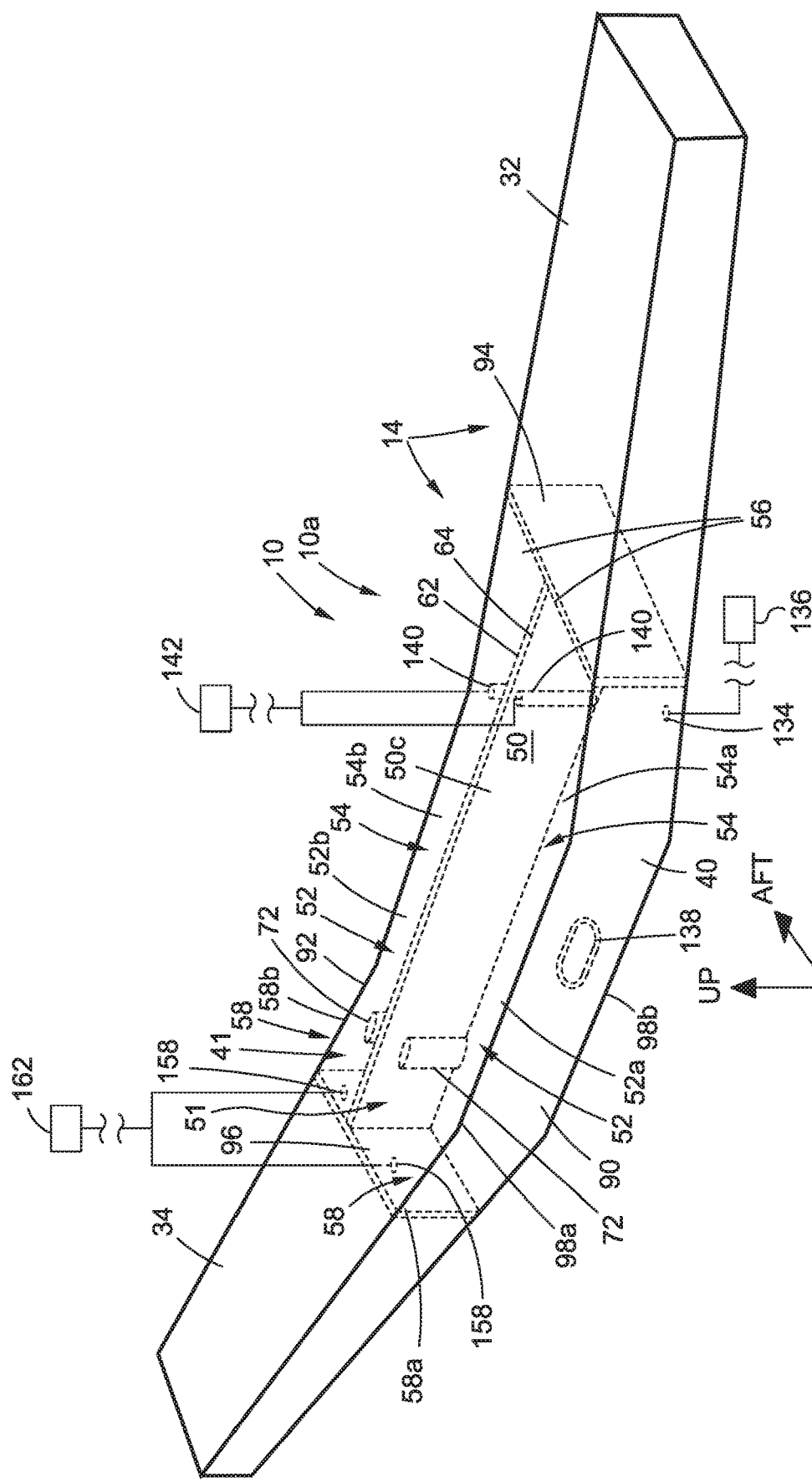
FIG. 4 is an illustration of a front perspective view of a fuel tank arrangement with a version of a center fuel tank assembly of the disclosure having a partitioned center fuel tank.

Now referring to FIG. 4, FIG. 4 is an illustration of a front perspective view of the fuel tank arrangement 14 with a version of the center fuel tank assembly 10, such as in the form of center fuel tank assembly 10a, of the disclosure, having the partitioned center fuel tank 41 that is partitioned into two separate sub-tanks 54 with the substantially linear fuel barrier 62. FIG. 4 shows directions arrows including a FWD (forward) direction arrow, an AFT direction arrow, and an UP direction arrow to show the orientation of the fuel tank arrangement 14. The surge tanks 36 (see FIG. 1) are not shown in the fuel tank arrangement 14 of FIG. 4.

As shown in FIG. 4, the center fuel tank assembly 10, such as in the form of center fuel tank assembly 10a, is positioned between the first main fuel tank 32, or left wing main fuel tank, and the second main fuel tank 34, or right wing main fuel tank. As further shown in FIG. 4, the center fuel tank assembly 10, such as in the form of center fuel tank assembly 10a, comprises the center fuel tank 40 partitioned with the fuel barrier member 50 into two separate volume sections 52 comprising two separate sub-tanks 54 arranged in the fore-to-aft alignment 56, to form the partitioned center fuel tank 41. As further shown in FIG. 4, the two separate volume sections 52 comprise the forward volume section 52a and the aft volume section 52b, and the two separate sub-tanks 54 comprise the forward sub-tank 54a and the aft sub-tank 54b.

As further shown in FIG. 4, the center fuel tank 40 is partitioned into the two separate volume sections 52 comprising the two separate sub-tanks 54 with the fuel barrier member 50 forming the substantially linear fuel barrier 62 having the substantially linear configuration 64. In this version, as shown in FIG. 4, the center fuel tank assembly 10, such as in the form of center fuel tank assembly 10a, comprises the center fuel tank 40 having one fuel barrier member 50, and two separate sub-tanks 54 comprising the forward sub-tank 54a and the aft sub-tank 54b. The fuel barrier member 50 (see FIG. 4) may be sealed with the sealing material 70 (see FIG. 6) to form the sealed fuel barrier member 51 (see FIG. 4).

In one version, the fuel barrier member 50 (see FIG. 4) may comprise the span wise beam 50c. Alternatively, the fuel barrier member 50 may comprise a structural wall partition 50a (see FIGS. 3A, 6), a rigid divider structure 50b (see FIGS. 3B, 6), a rib 50d (see FIGS. 3C, 6), a spar 50e (see FIG. 6), a stringer 50f (see FIG. 6), a panel 50g (see FIG. 6), or another suitable fuel barrier member 50.

As further shown in FIG. 4, each separate sub-tank 54 defines the closed interior fuel containment region 58 configured to contain fuel 60 (see FIG. 6) for the aircraft 12a (see FIG. 1). For example, the forward sub-tank 54a (see FIG. 4) defines the forward closed interior fuel containment region 58a (see FIG. 4) configured to contain fuel 60 (see FIG. 6), and the aft sub-tank 54b (see FIG. 4) defines the aft closed interior fuel containment region 58b (see FIG. 4) configured to contain fuel 60.

As further shown in FIG. 4, the partitioned center fuel tank 41 partitioned with the fuel barrier member 50 comprises the forward-most end 90, the aft-most end 92, the first side end 94, and the second side end 96, and the partitioned center fuel tank 41 may be in the form of integral fuel sub-tanks within the structure or airframe of the aircraft 12a (see FIG. 1). The forward-most end 90 (see FIG. 4) may comprise a spar, such as a front spar, or another suitable span wise rigid structure, that is closed or sealed, to prevent fuel 60 (see FIG. 6) from leaking or moving out of the forward volume section 52a (see FIG. 4) comprising the forward sub-tank 54a (see FIG. 4). The aft-most end 92 (see FIG. 4) may comprise a spar, such as a rear spar, or another suitable span wise rigid structure, that is closed or sealed, to prevent fuel 60 (see FIG. 6) from leaking or moving out of the aft volume section 52b (see FIG. 4) comprising the aft sub-tank 54b (see FIG. 4). The first side end 94 (see FIG. 4) and the second side end 96 (see FIG. 4) may comprise ribs, such as transverse ribs, or another suitable transverse rigid structure, that is closed or sealed, to prevent fuel 60 (see FIG. 6) from leaking or moving out of the forward volume section 52a (see FIG. 4) comprising the forward sub-tank 54a (see FIG. 4) and/or out of the aft volume section 52b (see FIG. 4) comprising the aft sub-tank 54b (see FIG. 4).

As further shown in FIG. 4, the center fuel tank assembly 10 may be sealed or closed on the top or upper side with a top panel 98a or top wall, such as in the form of an upper skin panel, or another suitable structure, and the center fuel tank assembly 10 may be sealed or closed on the bottom or lower side with a bottom panel 98b or bottom wall, such as in the form of a lower kin panel or another suitable structure. The center fuel tank assembly 10 (see FIG. 4) may be part of the central fuselage area 38a (see FIGS. 1, 6) and portions of the wings 18 (see FIG. 1), or may be part of a wing box 38b (see FIG. 6) and portions of the wings 18 (see FIGS. 1, 6) of the aircraft 12a (see FIGS. 1, 6).

As shown in FIG. 4, the partitioned center fuel tank 41, including the separate volume sections 52 comprising the separate sub-tanks 54, may thus be defined by the forward-most end 90 for the forward sub-tank 54a; the aft-most end 92 for the aft sub-tank 54b; the first side end 94, including a forward portion of the first side end 94 for the forward sub-tank 54a and an aft portion of the first side end 94 for the aft sub-tank 54b; the second side end 96, including a forward portion of the second side end 96 for the forward sub-tank 54a and an aft portion of the second side end 96 for the aft sub-tank 54b; the one fuel barrier member 50 functioning as an aft end for the forward sub-tank 54a and functioning as a forward end for the aft sub-tank 54b; the top panel 98a, including a forward portion of the top panel 98a for the forward sub-tank 54a and an aft portion of the top panel 98a for the aft sub-tank 54b; and the bottom panel 98b, including a forward portion of the bottom panel 98b for the forward sub-tank 54a and an aft portion of the bottom panel 98b for the aft sub-tank 54b. The partitioned center fuel tank 41, including the forward-most end 90, the aft-most end 92, the first side end 94, the second side end 96, the one or more fuel barrier members 50, the top panel 98a, and the bottom panel 98b may be welded together and/or attached together with fasteners or other attachment elements.

The partitioned center fuel tank 41, including the forward-most end 90, the aft-most end 92, the first side end 94, the second side end 96, the one or more fuel barrier members 50, the top panel 98a, and the bottom panel 98b may each be made of one or more of, a strong metal material such as steel, stainless steel, aluminum, titanium, or another strong metal material, or a composite material, or a combined metal and composite material. The partitioned center fuel tank 41, including the separate volume sections 52 comprising the separate sub-tanks 54 may have a substantially hollow interior.

It will be appreciated by one skilled in the art that the structural components of the center fuel tank assembly 10 having the partitioned center fuel tank 41, as illustrated in FIG. 4, represent a simplified assembly for illustrative purposes, and that the center fuel tank assembly 10 may include additional structural components including, but not limited to, internal support and stiffener structures (not shown), such as additional span wise beams, spars, stringers, ribs, and baffles, which may be attached to the interior of the top panel 98a and/or attached to the interior of the bottom panel 98b, or attached to another portion of each separate sub-tank 54.

As discussed above, the center fuel tank assembly 10 (see FIG. 4) further comprises the fuel flow control assembly 72 (see FIG. 4) to control the flow of fuel 60 (see FIG. 6) into and out of each of the two or more separate sub-tanks 54 (see FIG. 4). As shown in FIG. 4, the fuel flow control assembly 72 may be located in the interior of each of the two or more separate volume sections 52 comprising the two or more separate sub-tanks 54, and may be coupled to the fuel barrier member 50 or to another portion of each separate sub-tank 54. Each fuel flow control assembly 72 (see FIG. 4) operates independently and comprises one or more pumps 73 (see FIG. 6) coupled to one or more valves 74 (see FIG. 6). Each fuel flow control assembly 72 (see FIG. 4) may further include various other flow control components, such as fuel flow lines, drains, power sources, and controls for operating the fuel flow control assembly 72. The one or more pumps 73 (see FIG. 6) of the fuel flow control assembly 72 may comprise boost pumps, override pumps, or other types of suitable pumps 73, and the pumps 73 may be powered by electrical current from the aircraft electrical system, or may be driven with a motor, hydraulic power, or another suitable power source. The one or more valves 74 (see FIG. 6) may comprise check valves, float valves, shut-off valves, control valves, or other types of suitable valves 74. Each fuel flow control assembly 72 (see FIG. 4) independently controls the distribution of fuel 60 (see FIG. 6) in each separate sub-tank 54 (see FIG. 4), and each fuel flow control assembly 72 may deliver fuel 60 (see FIG. 6) to the engines 24 (see FIG. 6), or may transfer fuel 60 to other separate sub-tanks 54, to the first main fuel tank 32, to the second main fuel tank 34, or to another fuel tank, or may refuel or defuel the separate sub-tanks 54 of the center fuel tank assembly 10.

As shown in FIG. 4, the center fuel tank assembly 10 may further comprise one or more fuel pickup elements 134, such as in the form of a fuel pickup line, tube, drain, or other suitable fuel pickup element 134, located at a low point within the interior of each of the two or more separate volume sections 52 comprising the two or more separate sub-tanks 54. As shown in FIG. 4, the fuel pickup element 134 is coupled to each of the two or more separate volume sections 52 comprising the two or more separate sub-tanks 54, and the fuel pickup element 134 is preferably coupled to the interior of the bottom panel 98b portion of each separate sub-tank 54. The fuel pickup element 134 (see FIG. 4) is further preferably coupled to a fuel scavenge system 136 (see FIG. 4) for the aircraft 12a (see FIG. 1). The fuel pickup element 134 (see FIG. 4) is configured to transport fuel 60 (see FIG. 6), such as residual fuel 60e (see FIG. 6), from each of the two or more separate volume sections 52 (see FIG. 4) comprising the two or more separate sub-tanks 54 (see FIG. 44) to the fuel scavenge system 136 (see FIG. 4).

For example, when the fuel 60 (see FIG. 6) in each separate sub-tank 54 (see FIG. 4) falls below a certain level in the separate sub-tank 54, the fuel 60, such as the residual fuel 60e (see FIG. 6), remaining below that level is picked up by the one or more fuel pickup elements 134 and transferred to the fuel scavenge system 136. The fuel scavenge system 136 (see FIG. 4) may comprise fuel scavenge jet pumps that pump the fuel 60 (see FIG. 6), such as the residual fuel 60e (see FIG. 6), from the low points in the separate sub-tanks 54 of the center fuel tank 40 (see FIG. 4) into the first main fuel tank 32 (see FIG. 4) or into the second main fuel tank 34 (see FIG. 4), or into another fuel tank.

As shown in FIG. 4, the center fuel tank assembly 10 may further comprise one or more access openings 138, such as maintenance and inspection access openings or panels, formed through each of the two or more separate volume sections 52 comprising the two or more separate sub-tanks 54, and preferably located on the bottom panel 98b portion of each separate sub-tank 54, or located at another suitable portion of each separate sub-tank 54. The one or more access openings 138 (see FIG. 4) allow, or are configured to allow, access to the interior of each separate volume section 52 (see FIG. 4) comprising the separate sub-tank 54 (see FIG. 4) by operators or users for maintenance, inspection, and repair of each separate sub-tanks 54 (see FIG. 4) and components or structures within each separate sub-tank 54. Each of the one or more access openings 138 (see FIG. 4) may have a removable cover (not shown) and gaskets (not shown) or sealings to seal the access opening 138, so that no fuel 60 (see FIG. 6) may leak out of the separate sub-tank 54 (see FIG. 4).

As shown in FIG. 4, the center fuel tank assembly 10 may further comprise one or more fuel quantity indicators 140. As shown in FIG. 4, the one or more fuel quantity indicators 140 may be located within the interior of and coupled to each of the two or more separate volume sections 52 comprising the two or more separate sub-tanks 54. As further shown in FIG. 4, the one or more fuel quantity indicators 140 may be coupled to the fuel barrier member 50 or to another portion of each separate sub-tank 54. The one or more fuel quantity indicators 140 (see FIG. 4) may comprise sensors (not shown) or other sensing or indicating equipment (not shown) coupled within each separate sub-tank 54. As further shown in FIG. 4, each the one or more fuel quantity indicators 140 is further coupled to a fuel quantity indication system (FQIS) 142 for the aircraft 12a (see FIG. 1). The FQIS 142 (see FIG. 4) calculates, or is configured to calculate, a usable fuel quantity 144 (see FIG. 6) for each of the two or more separate volume sections 52 (see FIG. 4) comprising the two or more separate sub-tanks 54 (see FIG. 4), based on information received from the fuel quantity indicators 140. The FQIS 142 (see FIG. 4) reveals, or is configured to reveal, how much fuel 60 (see FIG. 6) is in each of the separate sub-tanks 54 (see FIG. 4) and provides such information to a pilot or other operators of the aircraft 12a (see FIG. 1).

As shown in FIG. 4, the center fuel tank assembly 10 may further comprise one or more nitrogen generation system (NGS) distribution elements 158, or nitrogen inerting system elements. As shown in FIG. 4, the one or more NGS distribution elements 158 may be coupled to each of the two or more separate volume sections 52 comprising the two or more separate sub-tanks 54. As further shown in FIG. 4, the one or more NGS distribution elements 158 may each be located in the interior of each separate sub-tank 54 and coupled to interior portions of the second side end 96 of the center fuel tank 40, or coupled to another portion of each separate sub-tank 54. The one or more NGS distribution elements 158 (see FIG. 4) are further coupled to a nitrogen generation system (NGS) 162 (see FIG. 4) for the aircraft 12a (see FIG. 1). The one or more NGS distribution elements 158 (see FIG. 4) distribute, or are configured to distribute, nitrogen-enriched air (NEA) 160 (see FIG. 6) into each separate sub-tank 54 (see FIG. 4) from the NGS 162 (see FIG. 4) for the aircraft 12a (see FIG. 1). The NEA 160 (see FIG. 6) may be delivered to each separate sub-tank 54 (see FIG. 4) to reduce oxygen concentrations in each separate sub-tank 54 and to decrease the probability of combustion of flammable materials in each separate sub-tank 54, by maintaining a chemically non-reactive or inert gas, such as nitrogen, within each separate sub-tank 54.

It will be appreciated by one skilled in the art that the various components coupled to the center fuel tank assembly 10 having the partitioned center fuel tank 41 as illustrated in FIG. 4 represent a simplified assembly for illustrative purposes, and that the center fuel tank assembly 10 may include additional components including, but not limited to, additional pumps, valves, fuel lines, vents, drains, controls, and other fuel tank components coupled to the center fuel tank assembly 10, or coupled between the center fuel tank assembly 10 and the first main fuel tank 32 and/or the second main fuel tank 34.

Figure 5A:
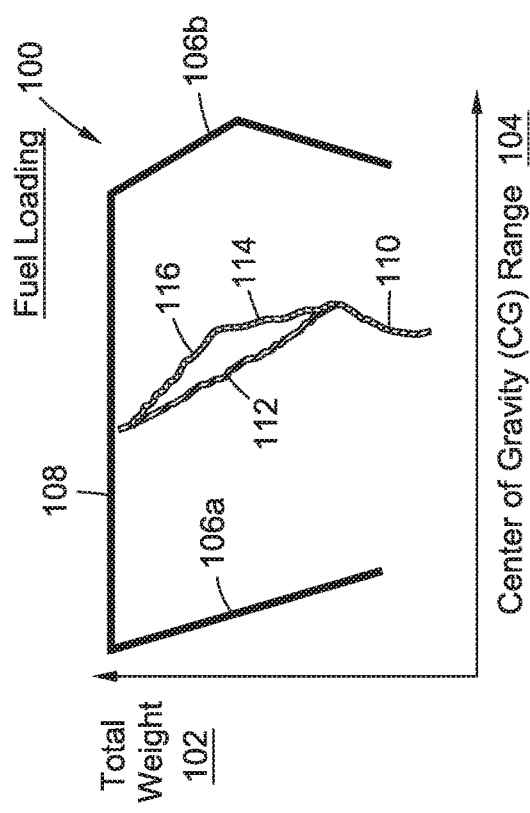
FIG. 5A is an illustration of a schematic diagram of a fuel loading chart for an aircraft.

Now referring to FIG. 5A, FIG. 5A is an illustration of a schematic diagram of a fuel loading chart 100, such as for refueling, for an aircraft. As shown in FIG. 5A, the fuel loading chart 100 shows a total weight 102 versus a center of gravity (CG) range 104 for the aircraft. The total weight 102 includes the weight of the aircraft, the weight of fuel needed for a planned flight or mission of the aircraft, the weight of cargo and passengers, and any other weight added to the aircraft. As further shown in FIG. 5A, the fuel loading chart 100 shows a forward center of gravity (CG) limit 106a, an aft center of gravity (CG) limit 106b, and a maximum takeoff weight 108.

As further shown in FIG. 5A, the fuel loading chart 100 shows fuel vectors for fuel loading that compare fuel loading for a fuel tank arrangement having an unpartitioned center fuel tank 88 (see FIG. 2) that is known, and fuel loading for a fuel tank arrangement having a version of the disclosed partitioned center fuel tank 41 (see FIGS. 3A, 4) with two separate sub-tanks 54 (see FIGS. 3A, 4), including a forward sub-tank 54a (see FIGS. 3A, 4) and an aft sub-tank 54b (see FIGS. 3A, 4). FIG. 5A shows a main fuel tanks fuel loading fuel vector 110 that applies to both the fuel tank arrangement having the unpartitioned center fuel tank 88 (see FIG. 2) and the fuel tank arrangement having the partitioned center fuel tank 41 (see FIGS. 3A, 4), where the main fuel tanks fuel loading fuel vector 110 indicates that fuel is first loaded evenly into both the main fuel tanks, including a first main fuel tank such as a left wing main fuel tank, and a second main fuel tank such as a right wing main fuel tank. FIG. 5A further shows an unpartitioned center fuel tank fuel loading fuel vector 112 for the fuel tank arrangement with the unpartitioned center fuel tank 88 (see FIG. 2), where the unpartitioned center fuel tank fuel loading fuel vector 112 indicates that after the main fuel tanks are fully loaded, if additional fuel is needed, then fuel is loaded into the unpartitioned center fuel tank 88 (see FIG. 2).

FIG. 5A further shows an aft sub-tank fuel loading fuel vector 114 for the fuel tank arrangement with the partitioned center fuel tank 41 (see FIGS. 3A, 4), where the aft sub-tank fuel loading fuel vector 114 indicates that after the main fuel tanks are fully loaded, if additional fuel is needed, then fuel is next loaded into the aft sub-tank 54b (see FIGS. 3A, 4) of the partitioned center fuel tank 41 when there are two separate sub-tanks 54 (see FIGS. 3A, 4). FIG. 5A further shows a forward sub-tank fuel loading fuel vector 116 for the fuel tank arrangement with the partitioned center fuel tank 41 (see FIGS. 3A, 4), where the forward sub-tank fuel loading fuel vector 116 indicates that after the aft sub-tank 54*b* (see FIGS. 3A, 4) is fully loaded with fuel, if additional fuel is still needed, then fuel is next loaded in an aft-to-fore sequence 84 (see FIG. 6) into the forward sub-tank 54*a* (see FIGS. 3A, 4). The aft-to-fore sequence 84 (see FIG. 6) of sequence loading of fuel 60 (see FIG. 6) in the partitioned center fuel tank 41 (see FIG. 6) results in a center of gravity (CG) 78 (see FIG. 6) that is positioned further aft, as compared to a less aft center of gravity (CG) 78*a* (see FIG. 6) that results from loading fuel 60 into the unpartitioned center fuel tank 88 (see FIG. 2).

Figure 5B:
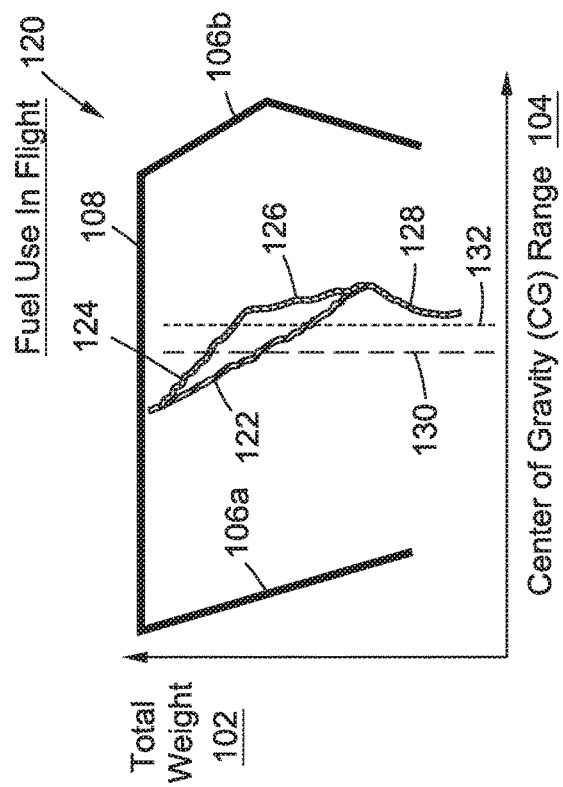
FIG. 5B is an illustration of a schematic diagram of a fuel use in flight chart for an aircraft.

Now referring to FIG. 5B, FIG. 5B is an illustration of a schematic diagram of a fuel use in flight chart 120 for an aircraft in flight, such as during cruise. As shown in FIG. 5B, the fuel use in flight chart 120 shows the total weight 102 versus the center of gravity (CG) range 104 for the aircraft. The total weight 102 includes the weight of the aircraft, the weight of fuel needed for a planned flight or mission of the aircraft, the weight of cargo and passengers, and any other weight added to the aircraft. As further shown in FIG. 5B, the fuel use in flight chart 120 shows the forward center of gravity (CG) limit 106*a*, the aft center of gravity (CG) limit 106*b*, and the maximum takeoff weight 108.

As further shown in FIG. 5B, the fuel use in flight chart 120 shows fuel vectors for fuel use in flight that compare fuel use in flight for a fuel tank arrangement having an unpartitioned center fuel tank 88 (see FIG. 2) that is known, and fuel use in flight for a fuel tank arrangement having a version of the disclosed partitioned center fuel tank 41 (see FIGS. 3A, 4) with two separate sub-tanks 54 (see FIGS. 3A, 4), including a forward sub-tank 54*a* (see FIGS. 3A, 4) and an aft sub-tank 54*b* (see FIGS. 3A, 4). FIG. 5B shows an unpartitioned center fuel tank fuel use fuel vector 122 for the fuel tank arrangement with the unpartitioned center fuel tank 88 (see FIG. 2), where the unpartitioned center fuel tank fuel use fuel vector 122 indicates that fuel in the unpartitioned center fuel tank 88 (see FIG. 2) is used first when the aircraft is in flight.

FIG. 5B further shows a forward sub-tank fuel use fuel vector 124 for the fuel tank arrangement with the partitioned center fuel tank 41 (see FIGS. 3A, 4), where the forward sub-tank fuel use fuel vector 124 indicates that fuel in the forward sub-tank 54*a* (see FIGS. 3A, 4) of the partitioned center fuel tank 41 is used first when the aircraft is in flight. FIG. 5B further shows an aft sub-tank fuel use fuel vector 126 for the fuel tank arrangement with the partitioned center fuel tank 41 (see FIGS. 3A, 4), where the aft sub-tank fuel use fuel vector 126 indicates that after the fuel in the forward sub-tank 54*a* (see FIGS. 3A, 4) is fully used, then fuel is next used in a fore-to-aft sequence 76 (see FIG. 6) in the aft sub-tank 54*b* (see FIGS. 3A, 4) when the aircraft is in flight.

FIG. 5B further shows a main fuel tanks fuel use fuel vector 128 that applies to both the fuel tank arrangement having the unpartitioned center fuel tank 88 (see FIG. 2) and the fuel tank arrangement having the partitioned center fuel tank 41 (see FIGS. 3A, 4), where the main fuel tanks fuel use fuel vector 128 indicates that after fuel is fully used in the unpartitioned center fuel tank 88 (see FIG. 2), then fuel is evenly used in the main fuel tanks, including the first main fuel tank such as the left wing main fuel tank, and the second main fuel tank such as the right wing main fuel tank, and also indicates that after fuel is fully used in the partitioned center fuel tank 41 (see FIGS. 3A, 4), then fuel is evenly used in the main fuel tanks, including the first main fuel tank such as the left wing main fuel tank, and the second main fuel tank such as the right wing main fuel tank.

The fore-to-aft sequence 76 (see FIG. 6) of sequencing the use of fuel in the aircraft in flight assists in shifting aftward the center of gravity (CG) 78 (see FIG. 6) of the aircraft, to reduce aircraft drag 80 (see FIG. 6). As shown in FIG. 5B, an average center of gravity (CG) 130 of the aircraft with the fuel tank arrangement having the unpartitioned center fuel tank 88 (see FIG. 2) over the duration of the planned flight 148 (see FIG. 6) or mission of the aircraft is positioned at a more forward position than an average center of gravity (CG) 132 of the aircraft with the fuel tank arrangement having the partitioned center fuel tank 41 (see FIGS. 3A, 4) over the duration of the planned flight 148 (see FIG. 6) or mission of the aircraft. The average CG 130 (see FIG. 5B) in the cruise portion of a flight using an unpartitioned center fuel tank is further forward because fuel is being burned across the entire volume of the unpartitioned center fuel tank. When the center fuel tank 40 (see FIGS. 1, 3A, 4) is partitioned to form the partitioned center fuel tank 41 (see FIGS. 1, 3A, 4), for example, with the forward sub-tank 54*a* (see FIGS. 3A, 4) and the aft sub-tank 54*b* (see FIGS. 3A, 4), fuel is burned first in the forward sub-tank 54*a*, which shifts or maintains the average CG 132 (see FIG. 5B) further aft, as the aft sub-tank 54*b* is fully loaded with fuel while the fuel is burned in the forward sub-tank 54*a*, and the fuel in the aft sub-tank 54*b* is not burned until all of the fuel needed is burned or substantially burned in the forward sub-tank 54*a*. The difference between the average CG 130 and the average CG 132, as shown in FIG. 5B, shows the average CG 132 of the aircraft with the fuel tank arrangement of the partitioned center fuel tank 41 (see FIGS. 3A, 4) being positioned at a more aft position than the average CG 130 of the aircraft with the fuel tank arrangement having the unpartitioned center fuel tank 88 (see FIG. 2). This center of gravity (CG) shift 79 (see FIG. 6) aftward results in improved performance of the aircraft, and results in reduced aircraft drag 80 (see FIG. 6).

Now referring to FIG. 6, FIG. 6 is an illustration of a functional block diagram showing a vehicle 12, such as in the form of an aircraft 12*a*, with the fuel tank arrangement 14 having versions of the center fuel tank assembly 10 of the disclosure. As shown in FIG. 6, and as discussed above, the vehicle 12, such as in the form of aircraft 12*a*, comprises the fuselage 16 and wings 18 attached to the fuselage 16. The wings 18 (see FIG. 6) preferably comprise a first wing 18*a* (see FIG. 1), or left wing, attached to one side of the fuselage 16 (see FIGS. 1, 6), and a second wing 18*b* (see FIG. 1), or right wing, oppositely attached to the other side of the fuselage 16.

As further shown in FIG. 6, the vehicle 12, such as in the form of aircraft 12*a*, comprises the first main fuel tank 32, such as the left wing main fuel tank, disposed in the first wing 18*a* (see FIG. 1) or left wing, and comprises the second main fuel tank 34, such as the right wing main fuel tank, disposed in the second wing 18*b* (see FIG. 1) or right wing. As further shown in FIG. 6, the vehicle 12, such as in the form of aircraft 12*a*, comprises the center fuel tank assembly 10 disposed in the central part 38 of the aircraft 12*a*, such as the central fuselage area 38*a* or the wing box 38*b*. The center fuel tank assembly 10 (see FIG. 6) is preferably positioned between the first main fuel tank 32 (see FIG. 6) and the second main fuel tank 34 (see FIG. 4). The fuel tank arrangement 14 (see FIG. 6) may comprise an integral fuel tank arrangement with integral fuel tanks within the structure or airframe of the aircraft 12a (see FIG. 6) or may comprise another suitable form or configuration.

As further shown in FIG. 6, the center fuel tank assembly 10 comprises the center fuel tank 40, for example, a center wing tank 40a, that is partitioned with one or more fuel barrier members 50, to form the partitioned center fuel tank 41. As discussed above, the center fuel tank 40 (see FIG. 6) is partitioned with the one or more fuel barrier members 50 (see FIG. 6) into two or more separate volume sections 52 (see FIG. 6) comprising two or more separate sub-tanks 54 (see FIG. 6) arranged in a fore-to-aft alignment 56 (see FIG. 6). Each of the two or more separate volume sections 52 (see FIG. 6) comprising the two or more separate sub-tanks 54 (see FIG. 6) defines a closed interior fuel containment region 58 (see FIGS. 3A, 4) configured to contain fuel 60 (see FIG. 6) for use by the vehicle 12 (see FIG. 6), such as the aircraft 12a (see FIG. 6). As further discussed above, the center fuel tank 40 (see FIGS. 1, 6) comprises a body 42 (see FIG. 1) with a center section 44 (see FIG. 1) within the central fuselage area 38a (see FIGS. 1, 6) of the fuselage 16 (see FIGS. 1, 6), a first portion 46 (see FIG. 1) extending laterally from the center section 44 and positioned within a first wing portion 20 (see FIG. 1) of the first wing 18a (see FIG. 1), and a second portion 48 (see FIG. 1) extending laterally from the center section 44 opposite the first portion 46 and positioned within a second wing portion 22 (see FIG. 1) of the second wing 18b (see FIG. 1).

In one version, the center fuel tank 40 (see FIGS. 3A, 6) may be partitioned with one fuel barrier member 50 (see FIGS. 3A, 6) into a forward sub-tank 54a (see FIGS. 3A, 6) and an aft sub-tank 54b (see FIGS. 3A, 6). In another version, the center fuel tank 40 (see FIGS. 3A, 6) may be partitioned with two fuel barrier members 50 (see FIGS. 3B, 6) into a forward sub-tank 54a (see FIGS. 3B, 6), an aft sub-tank 54b (see FIGS. 3B, 6), and an intermediate sub-tank 54c (see FIGS. 3B, 6) positioned between the forward sub-tank 54a and the aft sub-tank 54b. In other versions, the center fuel tank 40 (see FIG. 6) may be partitioned with more than two fuel barrier members 50 (see FIG. 6) into more than three separate sub-tanks 54 (see FIG. 6).

As further shown in FIG. 6, a separate sub-tank 54 of the center fuel tank assembly 10 may comprise an aft-most unloaded sub-tank 54d, which for fuel loading, such as for refueling, is first loaded with fuel 60 (see FIG. 6) if additional fuel 60 is needed, before any separate sub-tank 54 positioned forward of the aft-most unloaded sub-tank 54d, and after the first main fuel tank 32 (see FIG. 6) and the second main fuel tank 34 (see FIG. 6) are evenly and fully loaded with fuel 60, such as needed fuel 60a. As further shown in FIG. 6, the separate sub-tanks 54 may comprise one or more unloaded sub-tanks 54e that are empty and not yet loaded with fuel 60, such as needed fuel 60a, for a planned flight 148.

As further shown in FIG. 6, a separate sub-tank 54 of the center fuel tank assembly 10 may comprise a forward-most loaded sub-tank 54f, which for fuel loading, such as refueling, is last loaded with fuel 60, if additional fuel 60 is needed, after each separate sub-tank 54 positioned aft of the forward-most loaded sub-tank 54f is fully loaded with fuel 60, and after the first main fuel tank 32 (see FIG. 6) and the second main fuel tank 34 (see FIG. 6) are evenly and fully loaded with fuel 60. For use of fuel 60 (see FIG. 6) by the engines 24 (see FIG. 1) of the aircraft 12a (see FIG. 6) in flight, such as during cruise, the fuel 60 (see FIG. 6), such as needed fuel 60a (see FIG. 6), is first completely used in the forward-most loaded sub-tank 54f (see FIG. 6), before any fuel 60 is used in any loaded sub-tank 54g (see FIG. 6) positioned aft of the forward-most loaded sub-tank 54f, and before any fuel 60 is used in the first main fuel tank 32 (see FIG. 6) and the second main fuel tank 34 (see FIG. 6). As further shown in FIG. 6, the separate sub-tanks 54 may comprise one or more loaded sub-tanks 54g that are loaded with fuel 60, such as needed fuel 60a, for a planned flight 148, for use by engines 24 (see FIG. 1) of the aircraft 12a.

As further shown in FIG. 6, the center fuel tank assembly 10 may comprise a sealing material 70 that is applied to each of the one or more fuel barrier members 50, to completely seal each of the one or more fuel barrier members 50, to form a sealed fuel barrier member 51, and so as to prevent the fuel 60 from passing between the two or more separate volume sections 52 comprising the two or more separate sub-tanks 54. As shown in FIG. 6, the one or more fuel barrier members 50 may comprise one or more of, a structural wall partition 50a, a rigid divider structure 50b, a span wise beam 50c, a rib 50d, a spar 50e, a stringer 50f, a panel 50g, or another suitable fuel barrier member 50. In one version, the fuel barrier member 50 (see FIGS. 3A, 6) may comprise a substantially linear fuel barrier 62 (see FIGS. 3A, 6) having a substantially linear configuration 64 (see FIGS. 3A, 6) or straight configuration. In another version, the fuel barrier member 50 (see FIGS. 3C, 6) may comprise a nonlinear fuel barrier 66 (see FIGS. 3C, 6) having a nonlinear configuration 68 (see FIGS. 3C, 6) or staggered configuration.

As further shown in FIG. 6, the center fuel tank assembly 10 comprises the fuel flow control assembly 72, discussed in detail above, coupled to each of the two or more separate sub-tanks 54. Each fuel flow control assembly 72 (see FIG. 6) operates independently for each separate sub-tank 54 (see FIG. 6), and each fuel flow control assembly 72 preferably comprises one or more pumps 73 (see FIG. 6), one or more valves 74 (see FIG. 6), and other suitable components, as discussed above.

As further shown in FIG. 6, the center fuel tank assembly 10 comprises the fuel pickup element 134, discussed in detail above, coupled to each of the two or more separate sub-tanks 54, and further coupled to the fuel scavenge system 136 for the aircraft 12a. As further shown in FIG. 6, the center fuel tank assembly 10 comprises one or more access openings 138, discussed in detail above, formed through each of the two or more separate sub-tanks 54. As further shown in FIG. 6, the center fuel tank assembly 10 comprises one or more fuel quantity indicators 140, discussed in detail above, coupled to each of the two or more separate sub-tanks 54, and further coupled to the fuel quantity indication system (FQIS) 142 for the aircraft 12a. The FQIS 142 (see FIG. 6) calculates a usable fuel quantity 144 (see FIG. 6) in each of the two or more separate sub-tanks 54 (see FIG. 6). As further shown in FIG. 6, the center fuel tank assembly 10 comprises one or more nitrogen generation system (NGS) distribution elements 158, discussed in detail above, coupled to each of the two or more separate sub-tanks 54, and configured to distribute nitrogen-enriched air (NEA) 160 for a nitrogen generation system (NGS) 162 for the aircraft 12a.

As further shown in FIG. 6, the fuel 60 loaded in an aft-to-fore sequence 84 into the separate sub-tanks 54 of the center fuel tank assembly 10, and the fuel 60 sequentially used in a fore-to-aft sequence 76 during flight of the aircraft 12a by the separate sub-tanks 54 of the center fuel tank assembly 10, may comprise needed fuel 60a for a planned flight 148 or mission, including a portion 60b of the needed fuel 60a and a remaining needed fuel 60c. As further shown in FIG. 6, the fuel 60 may comprise loaded fuel 60d loaded into the first main fuel tank 32, the second main fuel tank 34, and one or more of the separate sub-tanks 54 in the aft to fore sequence 84. As further shown in FIG. 6, the fuel 60 may comprise a residual fuel 60e in each separate sub-tank 54 that may be removed by the fuel pickup element 134 and transported from each separate sub-tank 54 to the fuel scavenge system 136. As further shown in FIG. 6, the fuel 60 may comprise a reserve fuel 60f, including a needed reserve fuel 60g, that is used to determine a fuel quantity load 146 for the planned flight 148 or mission of the vehicle 12, such as the aircraft 12a.

A plurality of fuel quantity determination factors 150 (see FIG. 6) may be used to determine the fuel quantity load 146 (see FIG. 6) for the planned flight 148 (see FIG. 6) or mission of the vehicle 12 (see FIG. 6), such as the aircraft 12a (see FIG. 6). As shown in FIG. 6, such fuel quantity determination factors 150 may include a predetermined performance 152, or known performance, of the vehicle 12, such as the aircraft 12a, a planned flight distance 154, or mission length, of the vehicle 12, such as the aircraft 12a, and an amount 156 of the needed reserve fuel 60g needed for the planned flight 148.

With sequencing the use of fuel 60 (see FIG. 6) by the vehicle 12 (see FIG. 6), such as the aircraft 12a (see FIG. 6), for example, fuel burning by the engines 24 (see FIG. 1) using the center fuel tank assembly 10 (see FIG. 6), the sequential fuel burn 75 (see FIG. 6) of the fuel 60 (see FIG. 6) in the two or more separate volume sections 52 (see FIG. 6) comprising the two or more separate sub-tanks 54 (see FIG. 6) is made in the fore-to-aft sequence 76 (see FIG. 6), while the aircraft 12a (see FIG. 1) is in flight. This assists in shifting aftward the center of gravity (CG) 78 (see FIG. 6) of the aircraft 12a (see FIG. 6), to reduce aircraft drag 80 (see FIG. 6) with the CG shift 79 (see FIG. 6). The more the CG 78 (see FIG. 6) of the aircraft 12a (see FIG. 6) is positioned in an aft area 85 (see FIG. 6), or positioned aftward, the less fuel 60 (see FIG. 6) may be used or burned for the planned flight 148 (see FIG. 6). Thus, an aft center of gravity (CG) may save fuel 60 (see FIG. 6).

In addition, the CG shift 79 (see FIG. 6) may result in a longitudinal trim drag 80a (see FIG. 6) that is reduced and an aerodynamic trim drag 80b (see FIG. 6) that is reduced.

With sequencing the loading of fuel 60 (see FIG. 6) in the aircraft 12a (see FIG. 6) using the center fuel tank assembly 10 (see FIG. 6), a sequential fuel loading 82 (see FIG. 6) of the fuel 60 (see FIG. 6), in the two or more separate volume sections 52 (see FIG. 6) comprising the two or more separate sub-tanks 54 (see FIG. 6) is made in the aft-to-fore sequence 84 (see FIG. 6), while the aircraft 12a is being loaded with fuel 60, such as refueling the aircraft 12a, either on the ground or in the air. The aft-to-fore sequence 84 (see FIG. 6) of sequencing the loading of fuel 60 (see FIG. 6), including sequencing any remaining needed fuel 60c (see FIG. 6), in the partitioned center fuel tank 41 (see FIG. 6) results in a center of gravity (CG) 78 (see FIG. 6) for the aircraft 12a that is positioned further aft, as compared to a less aft and more forward center of gravity (CG) 78a (see FIG. 6) that results from loading fuel 60 into an aircraft having a fuel tank arrangement with an unpartitioned center fuel tank 88 (see FIG. 2).

Figure 7:
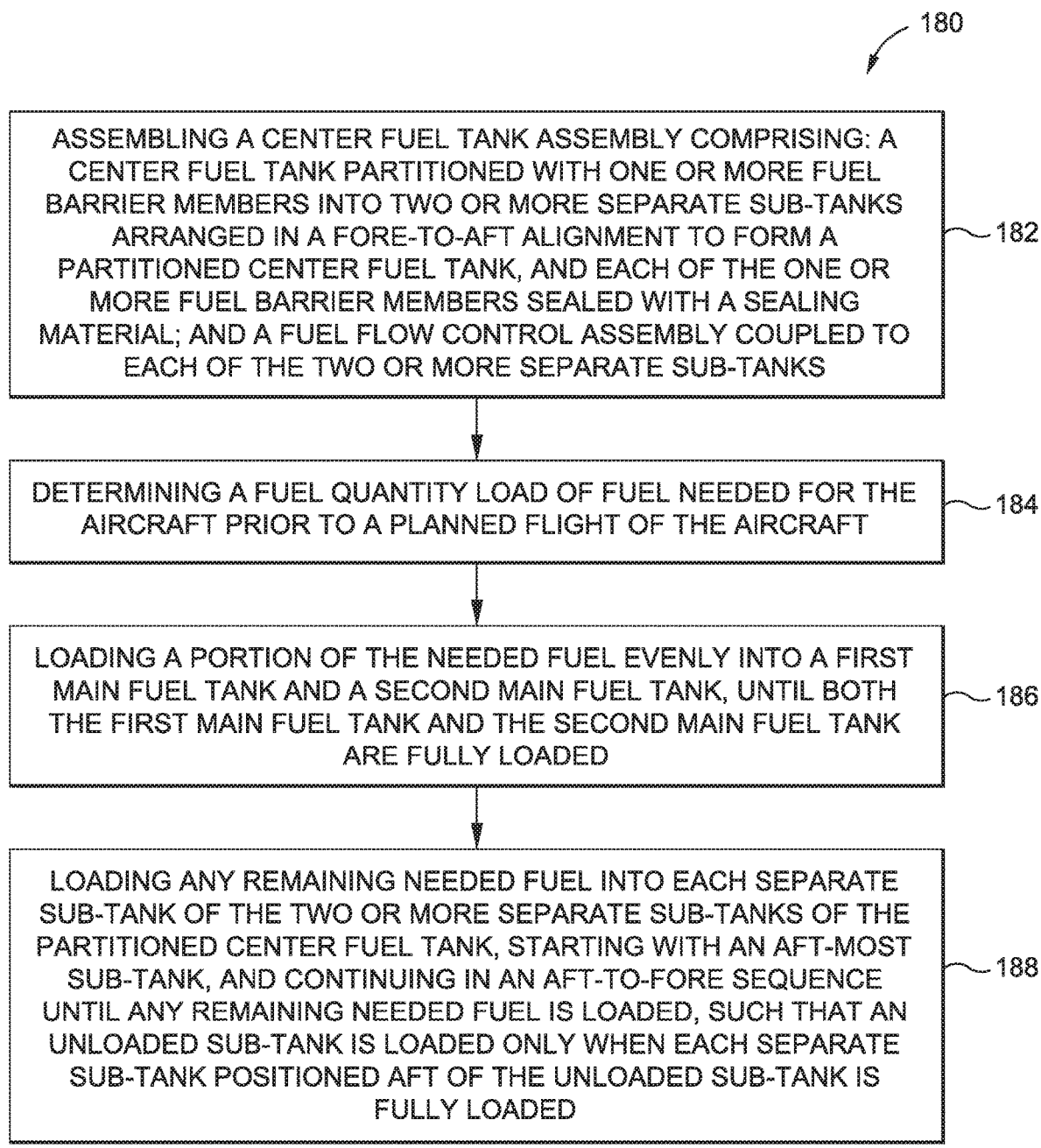
FIG. 7 is an illustration of a flow diagram of a version of a method of sequencing loading of fuel in an aircraft.

Now referring to FIG. 7, in another version there is provided a method 180 of sequencing loading of fuel 60 (see FIG. 6) in a vehicle 12 (see FIG. 1), such as an aircraft 12a (see FIG. 1). FIG. 7 is an illustration of a flow diagram of a version of the method 180 of loading fuel 60 (see FIG. 6) in the vehicle 12 (see FIG. 1), such as the aircraft 12a (see FIG. 1).

As shown in FIG. 7, the method 180 comprises step 182 of assembling a center fuel tank assembly 10 (see FIGS. 1, 6) in a central part 38 (see FIGS. 1, 6) of the aircraft 12a (see FIGS. 1, 6) between a first main fuel tank 32 (see FIGS. 1, 6) disposed in a first wing 18a (see FIG. 1) of the aircraft 12a and a second main fuel tank 34 (see FIGS. 1, 6) disposed in a second wing 18b (see FIG. 1) of the aircraft 12a. The center fuel tank assembly 10 (see FIGS. 1, 6), as discussed in detail above, comprises a center fuel tank 40 (see FIGS. 1, 6) partitioned with one or more fuel barrier members 50 (see FIGS. 1, 6) into two or more separate volume sections 52 (see FIGS. 1, 6) comprising two or more separate sub-tanks 54 (see FIGS. 1, 6) arranged in a fore-to-aft alignment 56 (see FIGS. 3A-3C, 6) to form a partitioned center fuel tank 41 (see FIGS. 1, 6).

Each of the two or more separate volume sections 52 (see FIGS. 1, 6) comprising two or more separate sub-tanks 54 (see FIGS. 1, 6) defines a closed interior fuel containment region 58 (see FIGS. 3A-3C) configured to contain fuel 60 (see FIG. 6) for use by the aircraft 12a (see FIGS. 1, 6). Each of the one or more fuel barrier members 50 (see FIGS. 1, 6) may be sealed with a sealing material 70 (see FIG. 6). The center fuel tank assembly 10 (see FIGS. 1, 6) further comprises a fuel flow control assembly 72 (see FIG. 6) coupled to each of the two or more separate volume sections 52 (see FIGS. 1, 6) comprising the two or more separate sub-tanks 54 (see FIGS. 1, 6). Each fuel flow control assembly 72 (see FIG. 6) operates independently.

The step 182 (see FIG. 7) of assembling the center fuel tank assembly 10 (see FIGS. 1, 6) may further comprise assembling the center fuel tank assembly 10, where each of the two or more separate volume sections 52 (see FIGS. 1, 6) comprising the two or more separate sub-tanks 54 (see FIGS. 1, 6) has a fuel pickup element 134 (see FIG. 6), one or more access openings 138 (see FIG. 6), a fuel quantity indicator 140 (see FIG. 6), and one or more nitrogen generation system (NGS) distribution elements 158 (see FIG. 6), all discussed in detail above.

As shown in FIG. 7, the method 180 further comprises step 184 of determining a fuel quantity load 146 (see FIG. 6) of fuel 60 (see FIG. 6) needed for the vehicle 12 (see FIG. 1), such as the aircraft 12a (see FIG. 1), prior to a planned flight 148 (see FIG. 6) of the aircraft 12a, to obtain the needed fuel 60a (see FIG. 6) amount necessary or required for the planned flight 148. The step 184 (see FIG. 7) of determining the fuel quantity load 146 (see FIG. 6) of fuel 60 (see FIG. 6) needed for the aircraft 12a prior to the planned flight 148 (see FIG. 6) of the aircraft 12a may comprise determining the fuel quantity load 146 based on a plurality of fuel quantity determination factors 150 (see FIG. 6), including a predetermined performance 152 (see FIG. 6) of the aircraft 12a, a planned flight distance 154 (see FIG. 6) of the planned flight 148 (see FIG. 6) of the aircraft 12a, and an amount 156 (see FIG. 6) of reserve fuel 60f (see FIG. 6) needed for the planned flight 148 to obtain a needed reserve fuel 60g (see FIG. 6) for the planned flight 148.

As shown in FIG. 7, the method 180 further comprises step 186 of loading a portion 60b (see FIG. 6) of the needed fuel 60a (see FIG. 6) evenly into the first main fuel tank 32 (see FIGS. 1, 6) and the second main fuel tank 34 (see FIGS. 1, 6), until both the first main fuel tank 32 and the second main fuel tank 34 are fully loaded with the portion 60b of the needed fuel 60a.

As shown in FIG. 7, the method 180 further comprises step 188 of loading any remaining needed fuel 60c (see FIG. 6) into each separate sub-tank 54 (see FIGS. 1, 6) of the two or more separate sub-tanks 54 of the partitioned center fuel tank 41 (see FIGS. 1, 6), starting with an aft-most unloaded sub-tank 54d (see FIG. 6), and continuing in an aft-to-fore sequence 84 (see FIG. 6) until any remaining needed fuel 60c (see FIG. 6) is loaded, and such that an unloaded sub-tank 54e (see FIG. 6) is loaded only when each separate sub-tank 54 (see FIGS. 1, 6) positioned aft of the unloaded sub-tank 54e (see FIG. 6), that is, an aft-positioned sub-tank, is fully loaded with any remaining needed fuel 60c.

The aft-to-fore sequence 84 (see FIG. 6) of sequencing loading of fuel 60 (see FIG. 6), including any remaining needed fuel 60c (see FIG. 6), in the partitioned center fuel tank 41 (see FIG. 6) preferably results in a center of gravity (CG) 78 (see FIG. 6) that is positioned further aft, as compared to a less aft center of gravity 78a (see FIG. 6) that results from loading fuel 60 (see FIG. 6) into an unpartitioned center fuel tank 88 (see FIG. 2). Thus, with the method 180 (see FIG. 7) of sequential fuel loading 82 (see FIG. 6) in the aft-to-fore sequence 84 (see FIG. 6), the aft-most unloaded sub-tank 54d (see FIG. 6) is loaded first with the remaining needed fuel 60c (see FIG. 6), and then each subsequent separate sub-tank 54 positioned forward of an adjacent aft loaded sub-tank 54g (see FIG. 6) is loaded with the remaining needed fuel 60c, as needed, and this focuses or assists in moving the center of gravity (CG) 78 (see FIG. 6) to an aft area 85 (see FIG. 6) of the center fuel tank 40 (see FIGS. 1, 6). Moving the center of gravity (CG) 78 aft results in less lift required from the wings 18 (see FIG. 1) and an overall reduction in aircraft drag 80 (see FIG. 6).

In one version, the step 182 (see FIG. 7) of assembling the center fuel tank assembly 10 (see FIGS. 1, 6) further comprises assembling the center fuel tank assembly 10 having one fuel barrier member 50 (see FIGS. 1, 6), and two separate sub-tanks 54 (see FIGS. 1, 6) comprising a forward sub-tank 54a (see FIGS. 3A, 6) and an aft sub-tank 54b (see FIGS. 3A, 6), and wherein the step 188 (see FIG. 7) of loading any remaining needed fuel 60c (see FIG. 6) into each separate sub-tank 54 (see FIGS. 1, 6) comprises first loading the aft sub-tank 54b (see FIGS. 3A, 6) with any remaining needed fuel 60c (see FIGS. 3A, 6), and when the aft sub-tank 54b is fully loaded with fuel 60 to obtain a loaded sub-tank 54g (see FIG. 6), then next loading the forward sub-tank 54a with any remaining needed fuel 60c.

Figure 8:
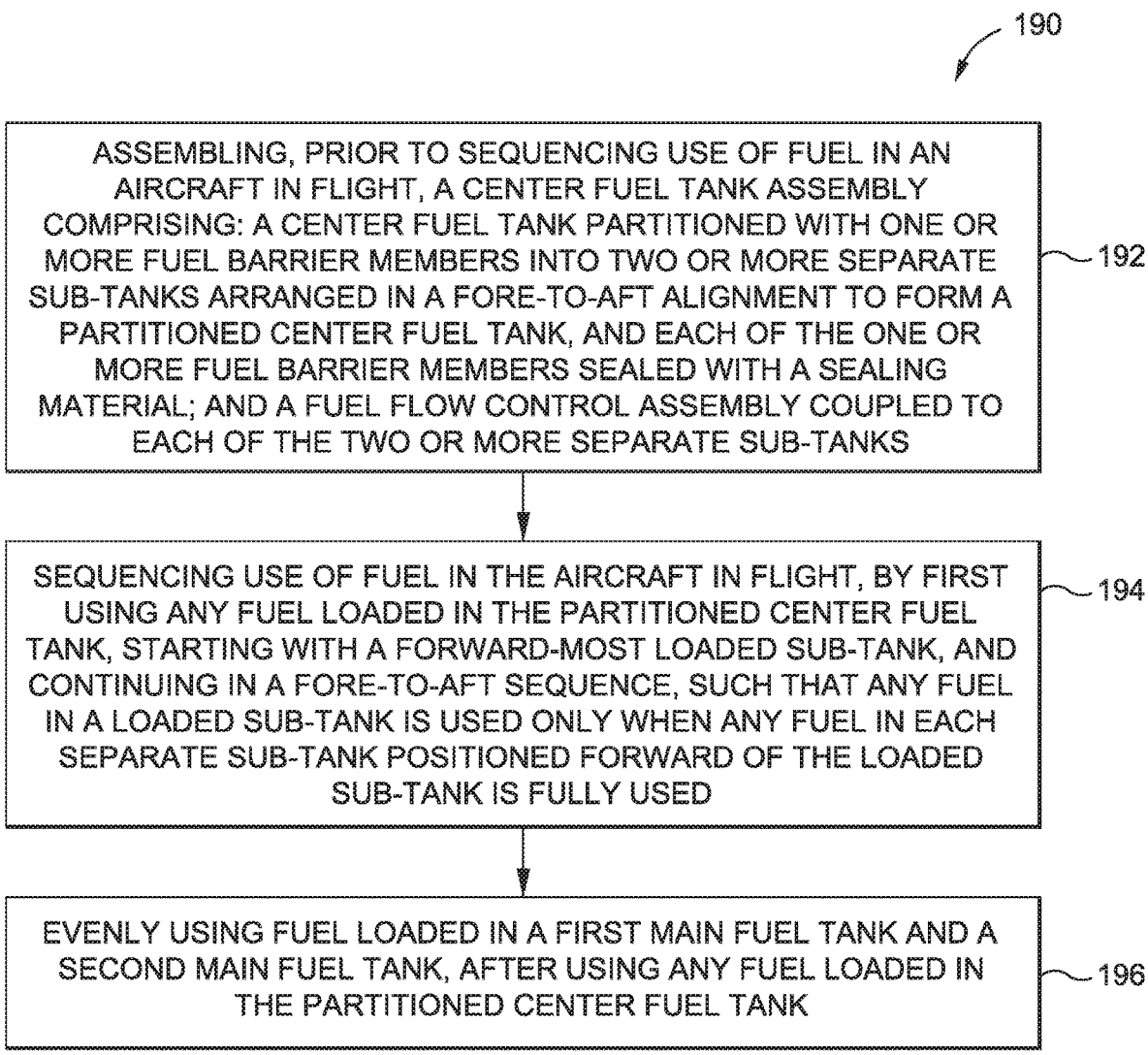
FIG. 8 is an illustration of a flow diagram of a version of a method of sequencing use of fuel in an aircraft in flight, to reduce aircraft drag.

Now referring to FIG. 8, in a version there is provided a method 190 of sequencing use of fuel 60 (see FIG. 6) in a vehicle 12 (see FIG. 1), such as an aircraft 12a (see FIG. 1), in flight, to reduce aircraft drag 80 (see FIG. 6). FIG. 8 is an illustration of a flow diagram of a version of the method 190 of sequencing use of fuel 60 (see FIG. 6) in the vehicle 12 (see FIG. 1), such as the aircraft 12a (see FIG. 1), in flight, to reduce aircraft drag 80 (see FIG. 6).

As shown in FIG. 8, the method 190 comprises step 192 of assembling, prior to sequencing use of fuel 60 (see FIG. 6) in the aircraft 12a (see FIG. 1) in flight, a center fuel tank assembly 10 (see FIGS. 1, 6) in a central part 38 (see FIGS. 1, 6) of the aircraft 12a between a first main fuel tank 32 (see FIGS. 1, 6) disposed in a first wing 18a (see FIG. 1) of the aircraft 12a, and a second main fuel tank 34 (see FIGS. 1, 6) disposed in a second wing 18b (see FIG. 1) of the aircraft 12a. As discussed in detail above, the center fuel tank assembly 10 (see FIGS. 1, 6) comprises the center fuel tank 40 (see FIGS. 1, 6) partitioned with one or more fuel barrier members 50 (see FIGS. 1, 6) into two or more separate volume sections 52 (see FIGS. 1, 6) comprising two or more separate sub-tanks 54 (see FIGS. 1, 6) arranged in a fore-to-aft alignment 56 (see FIGS. 3A, 6) to form a partitioned center fuel tank 41 (see FIGS. 1, 6). Each of the two or more separate volume sections 52 (see FIGS. 1, 3A) comprising the two or more separate sub-tanks 54 (see FIGS. 1, 3A) defines a closed interior fuel containment region 58 (see FIG. 3A) configured to contain fuel 60 (see FIG. 6) for use by the aircraft 12a (see FIG. 1). Each of the one or more fuel barrier members 50 (see FIGS. 1, 6) may be sealed with a sealing material 70 (see FIG. 6), to form one or more sealed fuel barrier members 51 (see FIGS. 1, 6). The center fuel tank assembly 10 (see FIGS. 1, 6) further comprises a fuel flow control assembly 72 (see FIG. 6) coupled to each of the two or more separate volume sections 52 (see FIGS. 1, 6) comprising the two or more separate sub-tanks 54 (see FIGS. 1, 6). Each fuel flow control assembly 72 (see FIG. 6) operates independently.

The step 192 (see FIG. 8) of the method 190 (see FIG. 8) of assembling the center fuel tank assembly 10 (see FIGS. 1, 6) further comprises assembling the center fuel tank assembly 10, where each of the two or more separate volume sections 52 (see FIGS. 1, 6) comprising the two or more separate sub-tanks 54 (see FIGS. 1, 6) has a fuel pickup element 134 (see FIG. 6), one or more access openings 138 (see FIG. 6), a fuel quantity indicator 140 (see FIG. 6), and one or more nitrogen generation system (NGS) distribution elements 158 (see FIG. 6), all discussed in detail above.

As shown in FIG. 8, the method 190 further comprises step 194 of sequencing use of fuel 60 (see FIG. 6) in the aircraft 12a (see FIGS. 1, 6) in flight, by first using any fuel 60 loaded in the partitioned center fuel tank 41 (see FIGS. 1, 6), starting with a forward-most loaded sub-tank 54f (see FIG. 6), and continuing in a fore-to-aft sequence 76 (see FIG. 6), such that any fuel 60 in a loaded sub-tank 54g (see FIG. 6) is used only when any fuel 60 in each separate sub-tank 54 positioned forward of the loaded sub-tank 54g is fully used.

As shown in FIG. 8, the method 190 further comprises step 194 of evenly using fuel 60 (see FIG. 6) loaded in the first main fuel tank 32 (see FIGS. 1, 6) and the second main fuel tank 34 (see FIGS. 1, 6), after using any fuel 60 loaded in the partitioned center fuel tank 41 (see FIGS. 1, 6). The fore-to-aft sequence 76 (see FIG. 6) of sequencing use of fuel 60 (see FIG. 6) in the aircraft 12a (see FIGS. 1, 6) in flight, or while or during flight, assists in shifting aftward the center of gravity (CG) 78 (see FIG. 6) of the aircraft 12a, to reduce aircraft drag 80 (see FIG. 6).

In one version, the step 192 (see FIG. 8) of assembling the center fuel tank assembly 10 further comprises assembling the center fuel tank assembly 10 (see FIGS. 1, 3A) having one fuel barrier member 50 (see FIGS. 1, 3A), and two separate sub-tanks 54 (see FIGS. 1, 3A) comprising a forward sub-tank 54a (see FIG. 3A) and an aft sub-tank 54b (see FIG. 3A), and the step 194 (see FIG. 8) of sequencing use of fuel 60 (see FIG. 6) in the aircraft 12a (see FIG. 1) in flight, by first using any fuel 60 loaded in the partitioned center fuel tank 41 (see FIG. 1), comprises first using any fuel 60 in the forward sub-tank 54a (see FIG. 3A), and when the fuel 60 is fully used in the forward sub-tank 54a, then using any fuel 60 in the aft sub-tank 54b (see FIG. 3A).

Figure 9:
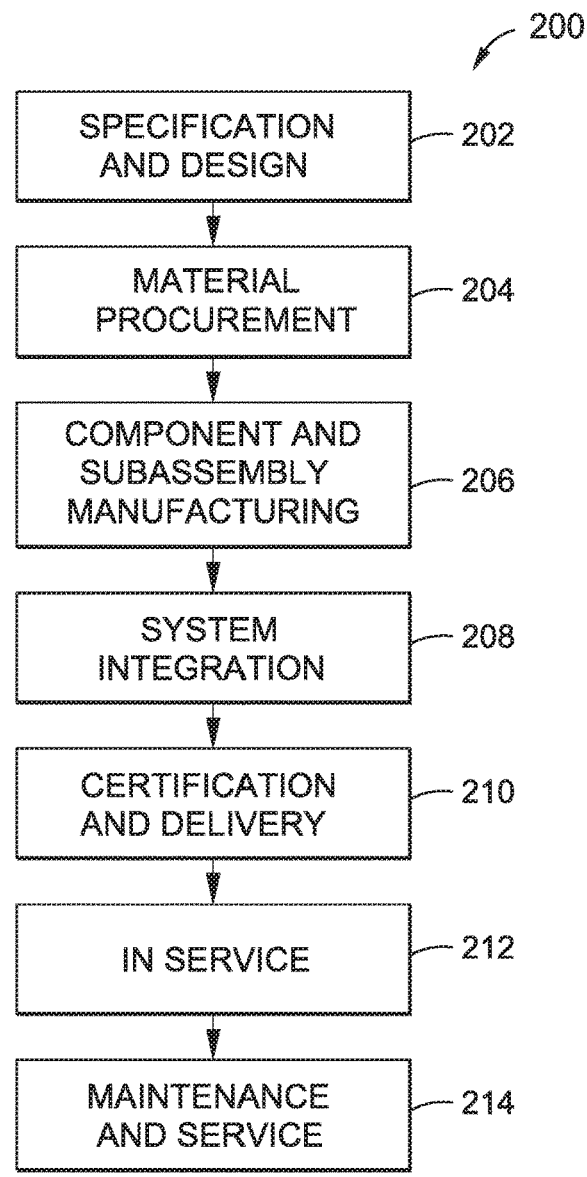
FIG. 9 is an illustration of a flow diagram of an aircraft manufacturing and service method.
Figure 10:
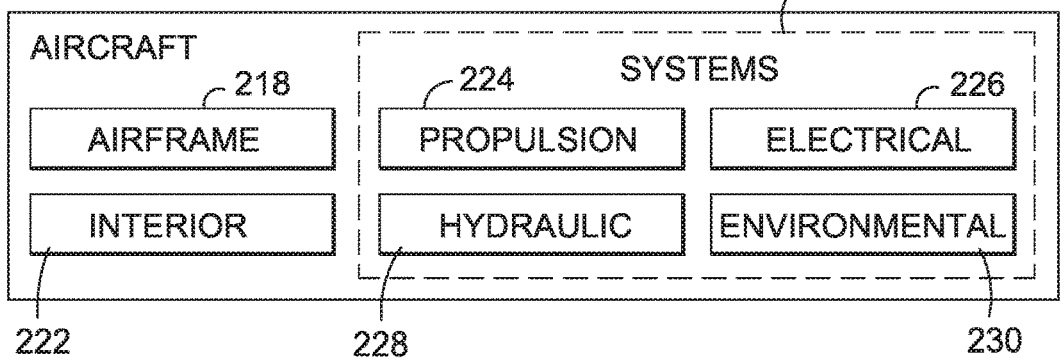
FIG. 10 is an illustration of a block diagram of an aircraft.

Now referring to FIGS. 9 and 10, FIG. 9 is an illustration of a flow diagram of an aircraft manufacturing and service method 200, and FIG. 10 is an illustration of a block diagram of an aircraft 216. Referring to FIGS. 9 and 10, versions of the disclosure may be described in the context of the aircraft manufacturing and service method 200 as shown in FIG. 9, and the aircraft 216 as shown in FIG. 10.

During pre-production, exemplary aircraft manufacturing and service method 200 may include specification and design 202 of the aircraft 216 and material procurement 204. During manufacturing, component and subassembly manufacturing 206 and system integration 208 of the aircraft 216 takes place. Thereafter, the aircraft 216 may go through certification and delivery 210 in order to be placed in service 212. While in service 212 by a customer, the aircraft 216 may be scheduled for routine maintenance and service 214 (which may also include modification, reconfiguration, refurbishment, and other suitable services).

Each of the processes of the aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 216 produced by the exemplary aircraft manufacturing and service method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

Methods and systems embodied herein may be employed during any one or more of the stages of the aircraft manufacturing and service method 200. For example, components or subassemblies corresponding to component and subassembly manufacturing 206 may be fabricated or manufactured in a manner similar to components or subassemblies produced while the aircraft 216 is in service 212. Also, one or more apparatus versions, method versions, or a combination thereof, may be utilized during component and subassembly manufacturing 206 and system integration 208, for example, by substantially expediting assembly of or reducing the cost of the aircraft 216. Similarly, one or more of apparatus versions, method versions, or a combination thereof, may be utilized while the aircraft 216 is in service 212, for example and without limitation, to maintenance and service 214.

Disclosed versions of the center fuel tank assembly 10 (see FIGS. 1, 3A-3C, 4) with the partitioned center fuel tank 41 (see FIGS. 1, 3A-3C, 4), and the method 180 (see FIG. 7) of sequencing the loading of fuel 60 (see FIG. 6) in an aircraft 12a (see FIGS. 1, 6), and the method 190 (see FIG. 8) of sequencing the use of fuel 60 in the aircraft 12a in flight, provide a solution to reduce aircraft drag 80 (see FIG. 6), longitudinal trim drag 80a (see FIG. 6), and aerodynamic trim drag 80b (see FIG. 6) of the aircraft 12a (see FIG. 1) by sequential fuel burn 75 (see FIG. 6), or fuel use, during flight of the aircraft 12a (see FIGS. 1, 6), to effectively shift the center of gravity (CG) 78 (see FIG. 6) aftward to an aft area 85 (see FIG. 6). In addition, disclosed versions of the center fuel tank assembly 10 (see FIGS. 1, 3A-3C, 4), the method 180 (see FIG. 7), and the method 190 (see FIG. 8) provide a simplified assembly and method of using the center fuel tank 40 (see FIGS. 1, 6) of an aircraft 12a (see FIGS. 1, 6), to enable a center of gravity (CG) shift 79 (see FIG. 6) of the center of gravity (CG) 78 (see FIG. 6) during flight, by partitioning the center fuel tank 40 with one or more fuel barrier members 50 (see FIGS. 1, 6), such that, the sequence of the fuel 60 (see FIG. 6) use from the center fuel tank 40, during flight, reduces the aircraft drag 80 (see FIG. 6), the longitudinal trim drag 80a (see FIG. 6), and the aerodynamic trim drag 80b (see FIG. 6) of the aircraft 12a (see FIG. 1).

Moreover, disclosed versions of the center fuel tank assembly 10 (see FIGS. 1, 3A-3C, 4), the method 180 (see FIG. 7), and the method 190 (see FIG. 8) effectively reduce the aircraft drag 80 (see FIG. 6), longitudinal trim drag 80a (see FIG. 6), and aerodynamic trim drag 80b (see FIG. 6) of the aircraft 12a (see FIG. 1), without adding significant weight with the addition of structures, systems, or components, and do not require additional fuel tanks in the aft body or horizontal tail of the aircraft 12a, as compared to known systems and methods using added trim tanks located in the aft body or horizontal tail to move fuel during flight. In particular, with the partitioned center fuel tank 41 (see FIGS. 1, 3A-3C, 4, 6) disclosed herein, any added structural weight is minimized because the one or more fuel barrier members 50 (see FIGS. 1, 3B, 6) may be formed from span wise beams 50c (see FIG. 6), and/or ribs 50d (see FIGS. 3C, 6), and/or other structures that may already be used in the center fuel tank 40 and thus do not need to be added to form all or part of the one or more fuel barrier members 50. For example, in one version, a fuel barrier member 50 (see FIG. 1), such as a span wise beam 50c (see FIG. 6), that is already existing and located in the center section 44 (see FIG. 1) of the center fuel tank 40 (see FIG. 1) may be sealed with a sealing material 70 (see FIG. 6), and additional fuel barrier members 50, such as ribs 50d (see FIG. 6), structural wall partitions 50a (see FIG. 1), or another type of fuel barrier member 50, may be sealed and added in the first portion 46 (see FIG. 1), such as the first cheek portion 46a (see FIG. 3A), and the second portion 48 (see FIG. 1), such as the second cheek portion 48a (see FIG. 3A), to partition the center fuel tank 40 into separate sub-tanks 54 (see FIG. 1), such as a forward sub-tank 54a (see FIG. 4) and an aft sub-tank 54b (see FIG. 4).

In addition, disclosed versions of the center fuel tank assembly 10 (see FIGS. 1, 3A-3C, 4), the method 180 (see FIG. 7), and the method 190 (see FIG. 8) effectively reduce the aircraft drag 80 (see FIG. 6), longitudinal trim drag 80a (see FIG. 6), and aerodynamic trim drag 80b (see FIG. 6) of the aircraft 12a (see FIG. 1), with a simple, less expensive, and more effective solution, and do not require complex and additional redundant design features to safeguard against a possibility of fuel being left in an aft body or a horizontal tail tank, as compared to known systems and methods using trim tanks located in the aft body or horizontal tail to move fuel during flight that require such complex and additional redundant design features. The novel center fuel tank assembly 10 (see FIGS. 1, 3A-3C, 4), method 180 (see FIG. 7), and method 190 (see FIG. 8) manage and sequence the location of the fuel 60 (see FIG. 6) by partitioning the center fuel tank 40 (see FIG. 1) in a manner that uses fuel 60 from the forward-most loaded sub-tank 54f (see FIG. 6) first and then, if needed, using fuel 60 in a fore-to-aft sequence 76 (see FIG. 6) from one or more loaded sub-tanks 54g (see FIG. 6) positioned aft of the forward-most loaded sub-tank 54f, which may result in a more aft center of gravity (CG) 78 (see FIG. 6) location and which focuses the CG 78 in an aft area 85 (see FIG. 6), and which, in turn, may reduce aircraft drag 80 (see FIG. 6) and reduce any stress on the wings 18 (see FIG. 1) and any stress on the horizontal stabilizers 30a (see FIG. 1) of the tail section 30 (see FIG. 1). For the case when the CG 78 (see FIG. 6) is moved aft, due to controlling the fuel burn of the partitioned center fuel tank 41 (see FIG. 1), the amount of downward lift needed to be generated by the horizontal stabilizers 30a (see FIG. 1) of the tail section 30 (see FIG. 1) is reduced. This reduces the lift needed to be generated by the wings 18 (see FIG. 1). This reduction of both the lift of the horizontal stabilizers 30a (see FIG. 1) and the lift of the wings 18 (see FIG. 1), results in a reduced aircraft drag 80 (see FIG. 6) and a reduced aerodynamic trim drag 80b (see FIG. 6) of the aircraft 12a (see FIG. 1), and such reduced aircraft drag 80 and reduced aerodynamic trim drag 80b results in less fuel burn required by the engines 24 (see FIG. 1).

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A center fuel tank assembly for an aircraft, the center fuel tank assembly comprising:
    a center fuel tank disposed in a central part of the aircraft;
    one or more fuel barrier members partitioning the center fuel tank into two or more separate volume sections comprising two or more separate sub-tanks arranged in a fore-to-aft alignment to form a partitioned center fuel tank, each of the two or more separate sub-tanks defining a closed interior fuel containment region configured to contain fuel for use by the aircraft; and
    a fuel flow control assembly coupled to each of the two or more separate sub-tanks, each fuel flow control assembly operating independently, and the fuel flow control assembly configured to control a sequential fuel burn of the fuel in the two or more separate sub-tanks in a fore-to-aft sequence while the aircraft is in flight, to assist in shifting aftward a center of gravity (CG) of the aircraft, to reduce aircraft drag.

2. The center fuel tank assembly of claim 1, further comprising a fuel pickup element coupled to each of the two or more separate sub-tanks, the fuel pickup element further coupled to a fuel scavenge system for the aircraft, wherein the fuel pickup element is configured to transport any residual fuel from each of the two or more separate sub-tanks to the fuel scavenge system.

3. The center fuel tank assembly of claim 1, further comprising one or more access openings formed through each of the two or more separate sub-tanks.

4. The center fuel tank assembly of claim 1, further comprising a fuel quantity indicator coupled to each of the two or more separate sub-tanks, the fuel quantity indicator further coupled to a fuel quantity indication system (FQIS) for the aircraft that calculates a usable fuel quantity in each of the two or more separate sub-tanks.

5. The center fuel tank assembly of claim 1, further comprising one or more nitrogen generation system (NGS) distribution elements coupled to each of the two or more separate sub-tanks, the one or more NGS distribution elements configured to distribute nitrogen-enriched air (NEA) for a nitrogen generation system (NGS) for the aircraft.

6. The center fuel tank assembly of claim 1, wherein the one or more fuel barrier members comprise one or more of, a structural wall partition, a rigid divider structure, a span wise beam, a rib, a spar, a stringer, and a panel.

7. The center fuel tank assembly of claim 1, wherein the one or more fuel barrier members form one or more substantially linear fuel barriers between the two or more separate sub-tanks.

8. The center fuel tank assembly of claim 1, wherein the one or more fuel barrier members form one or more non-linear fuel barriers between the two or more separate sub-tanks.

9. The center fuel tank assembly of claim 1, wherein the center fuel tank has one fuel barrier member, and two separate sub-tanks comprising a forward sub-tank and an aft sub-tank.

10. The center fuel tank assembly of claim 1, wherein the center fuel tank has two fuel barrier members, and three separate sub-tanks comprising a forward sub-tank, an aft sub-tank, and an intermediate sub-tank.

11. The center fuel tank assembly of claim 1, further comprising a sealing material applied to each of the one or more fuel barrier members, to seal each of the one or more fuel barrier members, so as to prevent the fuel from passing between the two or more separate sub-tanks.

12. An aircraft comprising:
    a fuselage;
    a first wing and a second wing, each attached to the fuselage;
    a first main fuel tank disposed in the first wing;
    a second main fuel tank disposed in the second wing; and
    a center fuel tank assembly disposed in a central part of the aircraft, and positioned between the first main fuel tank and the second main fuel tank, the center fuel tank assembly comprising:
        a center fuel tank comprising a body with a center section within a central fuselage area of the fuselage, a first portion extending laterally from the center section and positioned within a first wing portion of the first wing, and a second portion extending laterally from the center section opposite the first portion and positioned within a second wing portion of the second wing;
        one or more fuel barrier members partitioning the center fuel tank into two or more separate volume sections comprising two or more separate sub-tanks arranged in a fore-to-aft alignment to form a partitioned center fuel tank, each of the two or more separate sub-tanks defining a closed interior fuel containment region configured to contain fuel for use by the aircraft;
        a sealing material applied to each of the one or more fuel barrier members, to seal each of the one or more fuel barrier members, so as to prevent the fuel from passing between the two or more separate sub-tanks;
        a fuel flow control assembly coupled to each of the two or more separate sub-tanks, each fuel flow control assembly operating independently, and the fuel flow control assembly configured to control a sequential fuel burn of the fuel in the two or more separate sub-tanks in a fore-to-aft sequence while the aircraft is in flight, to assist in shifting aftward a center of gravity (CG) of the aircraft, to reduce aircraft drag;
        a fuel pickup element coupled to each of the two or more separate sub-tanks and further coupled to a fuel scavenge system for the aircraft;
        one or more access openings formed through each of the two or more separate sub-tanks;
        a fuel quantity indicator coupled to each of the two or more separate sub-tanks and further coupled to a fuel quantity indication system (FQIS) for the aircraft that calculates a usable fuel quantity in each of the two or more separate sub-tanks; and
        one or more nitrogen generation system (NGS) distribution elements coupled to each of the two or more separate sub-tanks, and configured to distribute nitrogen-enriched air (NEA) for a nitrogen generation system (NGS) for the aircraft.

13. The aircraft of claim 12, wherein the one or more fuel barrier members comprise one or more of, a structural wall partition, a rigid divider structure, a span wise beam, a rib, a spar, a stringer, and a panel.

14. A method of sequencing loading of fuel in an aircraft, the method comprising the steps of:
 assembling a center fuel tank assembly in a central part of the aircraft between a first main fuel tank disposed in a first wing of the aircraft and a second main fuel tank disposed in a second wing of the aircraft, the center fuel tank assembly comprising:
  a center fuel tank partitioned with one or more fuel barrier members into two or more separate sub-tanks arranged in a fore-to-aft alignment to form a partitioned center fuel tank, each of the two or more separate sub-tanks defining a closed interior fuel containment region configured to contain fuel for use by the aircraft, and each of the one or more fuel barrier members sealed with a sealing material; and
  a fuel flow control assembly coupled to each of the two or more separate sub-tanks, each fuel flow control assembly operating independently;
 determining a fuel quantity load of fuel needed for the aircraft prior to a planned flight of the aircraft;
 loading a portion of the needed fuel evenly into the first main fuel tank and the second main fuel tank, until both the first main fuel tank and the second main fuel tank are fully loaded; and
 loading any remaining needed fuel into each separate sub-tank of the two or more separate sub-tanks of the partitioned center fuel tank, starting with an aft-most unloaded sub-tank, and continuing in an aft-to-fore sequence until any remaining needed fuel is loaded, such that an unloaded sub-tank is loaded only when each separate sub-tank positioned aft of the unloaded sub-tank is fully loaded,
 wherein the aft-to-fore sequence of sequencing loading of fuel, including any remaining needed fuel, in the partitioned center fuel tank results in a center of gravity (CG) that is positioned further aft, as compared to a less aft center of gravity (CG) that results from loading fuel into an unpartitioned center fuel tank.

15. The method of claim 14, wherein assembling the center fuel tank assembly further comprises assembling the center fuel tank assembly, where each of the two or more separate sub-tanks has a fuel pickup element, one or more access openings, a fuel quantity indicator, and one or more nitrogen generation system (NGS) distribution elements.

16. The method of claim 14, wherein assembling the center fuel tank assembly further comprises assembling the center fuel tank assembly having one fuel barrier member, and two separate sub-tanks comprising a forward sub-tank and an aft sub-tank, and wherein loading any remaining needed fuel into each separate sub-tank comprises first loading the aft sub-tank with any remaining needed fuel, and when the aft sub-tank is fully loaded, then loading the forward sub-tank with any remaining needed fuel.

17. The method of claim 14, wherein determining the fuel quantity load of fuel needed for the aircraft prior to the planned flight of the aircraft comprises determining the fuel quantity load based on a plurality of fuel quantity determination factors, including a predetermined performance of the aircraft, a planned flight distance of the planned flight of the aircraft, and an amount of needed reserve fuel needed for the planned flight.

18. A method of sequencing use of fuel in an aircraft in flight, to reduce aircraft drag, the method comprising the steps of:
 assembling, prior to sequencing use of fuel in the aircraft in flight, a center fuel tank assembly in a central part of the aircraft between a first main fuel tank disposed in a first wing of the aircraft and a second main fuel tank disposed in a second wing of the aircraft, the center fuel tank assembly comprising:
  a center fuel tank partitioned with one or more fuel barrier members into two or more separate sub-tanks arranged in a fore-to-aft alignment to form a partitioned center fuel tank, each of the two or more separate sub-tanks defining a closed interior fuel containment region configured to contain fuel for use by the aircraft, and each of the one or more fuel barrier members sealed with a sealing material; and
  a fuel flow control assembly coupled to each of the two or more separate sub-tanks, each fuel flow control assembly operating independently;
 sequencing use of fuel in the aircraft in flight, by first using any fuel loaded in the partitioned center fuel tank, starting with a forward-most loaded sub-tank, and continuing in a fore-to-aft sequence, such that any fuel in a loaded sub-tank is used only when any fuel in each separate sub-tank positioned forward of the loaded sub-tank is fully used; and
 evenly using fuel loaded in the first main fuel tank and the second main fuel tank, after using any fuel loaded in the partitioned center fuel tank,
 wherein the fore-to-aft sequence of sequencing use of fuel in the aircraft in flight assists in shifting aftward a center of gravity (CG) of the aircraft, to reduce aircraft drag.

19. The method of claim 18, wherein assembling the center fuel tank assembly further comprises assembling the center fuel tank assembly, where each of the two or more separate sub-tanks has a fuel pickup element, one or more access openings, a fuel quantity indicator, and one or more nitrogen generation system (NGS) distribution elements.

20. The method of claim 18, wherein assembling the center fuel tank assembly further comprises assembling the center fuel tank assembly having one fuel barrier member, and two separate sub-tanks comprising a forward sub-tank and an aft sub-tank, and wherein sequencing use of fuel in the aircraft in flight, by first using any fuel loaded in the partitioned center fuel tank, comprises first using any fuel in the forward sub-tank, and when the fuel is fully used in the forward sub-tank, then using any fuel in the aft sub-tank.

* * * * *